US008894417B2

(12) United States Patent
Mandel

(10) Patent No.: US 8,894,417 B2
(45) Date of Patent: Nov. 25, 2014

(54) GUIDING A CHILD TO PERFORM TASKS

(71) Applicant: Ayla Mandel, Los Angeles, CA (US)

(72) Inventor: Ayla Mandel, Los Angeles, CA (US)

( * ) Notice: Subject to any disclaimer, the term of this patent is extended or adjusted under 35 U.S.C. 154(b) by 0 days.

(21) Appl. No.: 13/759,780

(22) Filed: Feb. 5, 2013

(65) Prior Publication Data

US 2014/0220546 A1 Aug. 7, 2014

(51) Int. Cl.
G09B 19/00 (2006.01)

(52) U.S. Cl.
CPC .................................. G09B 19/00 (2013.01)
USPC ........................................................ 434/428

(58) Field of Classification Search
CPC ..................... G09B 19/0076; G09B 19/0038
USPC ........................................................ 434/428
See application file for complete search history.

(56) References Cited

U.S. PATENT DOCUMENTS

| 6,554,619 | B2 * | 4/2003 | Williams ..................... 434/365 |
| 2005/0136384 | A1 * | 6/2005 | Jarvis ........................... 434/263 |
| 2013/0078600 | A1 * | 3/2013 | Fischer et al. ................ 434/236 |

* cited by examiner

Primary Examiner — Robert J Utama
Assistant Examiner — Robert P Bullington
(74) Attorney, Agent, or Firm — McAndrews, Held & Malloy, Ltd.

(57) ABSTRACT

The present disclosure describes one or more systems, methods, routines and/or techniques for guiding a child (or other person) to perform tasks. The present disclosure may help children (or other people) perform various tasks (e.g., taking a shower) without a parent having to be present with the child during each task. One or more embodiments may describe a guidance device comprising a display and circuitry and/or computer code disposed in the guidance device. The display may show a figure with multiple parts. The guidance device may be operable to progress through multiple defined time segments. During each one of the multiple defined time segments, the guidance device may indicate one or more of the multiple parts of the figure that are associated with a sub-task that the user should perform. The guidance device may indicate completion progress of the time segment and the sub-task.

30 Claims, 9 Drawing Sheets

GUIDING A CHILD TO PERFORM TASKS

FIELD

The present disclosure relates to a user interacting with a mobile device that includes circuitry and/or a software program, and more particularly to one or more systems, methods, routines and/or techniques for guiding a child to perform tasks

BACKGROUND

Mobile devices such as tablet computers (or tablets) have become more popular and more advanced. Some tablets incorporate a processor that runs computer code, including code that implements an operating system (OS). Some tablets may run a version of a popular mobile operating system, for example, a mobile operating system that is designed to run on various types of mobile devices (e.g., smartphones, tablets, etc.). Some tablets may run a proprietary, customized or modified operating system, for example, an operating system that is a modified version of a popular mobile operating system or an operating system that is specifically designed for the exact tablet. Computer code run by a tablet may include both native code (i.e., code written by the creator of the tablet and/or the operating system) and code developed by third parties (e.g., third party applications).

Various companies (e.g., LeapFrog) have developed portable learning systems for children. These portable learning systems may accept cartridges that include content and/or the systems may download content from the internet. The content may include learning applications, e-books, videos, games and flashcards. The systems may be molded out of plastic and may have physical buttons, digital screens and the like to accept input from a child and to convey information to the child.

Further limitations and disadvantages of conventional and traditional approaches will become apparent to one of skill in the art, through comparison of such systems with some aspects of the present disclosure as set forth in the remainder of the present application and with reference to the drawings.

SUMMARY

The present disclosure describes one or more systems, methods, routines and/or techniques for guiding a child (or other person) to perform tasks. The present disclosure may help children (or other people) perform various tasks (e.g., taking a shower) without a parent having to be present with the child during each task. One or more embodiments may describe a guidance device comprising a display and circuitry and/or computer code disposed in the guidance device. The display may show a figure with multiple parts. The guidance device may be operable to progress through multiple defined time segments. During each one of the multiple defined time segments, the guidance device may indicate one or more of the multiple parts of the figure that are associated with a sub-task that the user should perform. The guidance device may indicate completion progress of the time segment and the sub-task.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

DETAILED DESCRIPTION

Children often require guidance to perform various tasks, for example, bathing, showering, getting dressed, etc. As one specific example, younger children may be unsure of how to wash themselves in the shower, for example, which body parts to wash and how long to wash each body part. Parents may not have time to repeatedly show a child which parts to wash and how long, and, furthermore, a child may not want their parents in the bathroom with them when they are washing. If a parent is not in the bathroom with a child during washing, the parent may have to repeatedly ask the child a series of questions to ensure that the child performed all the desired tasks. For example, "Johnny, did you wash your neck? Did you wash your legs?" This repeated series of questions may be annoying and/or time consuming for the parents and for the children.

The present disclosure describes one or more systems, methods, routines and/or techniques for guiding a child to perform tasks. For example, the present disclosure may help children who are learning how to take a bath or shower by themselves. The present disclosure may help children who are learning how to perform other activities as well, for example, getting dressed, brushing teeth, braiding hair, getting ready for school in the morning, planting a garden and/or learning various safety procedures and the like. The present disclosure may help children perform various tasks without a parent having to be present with the child during each task, and without a parent having to ask a series of questions after each task to ensure that the child performed the task satisfactorily. The present disclosure may teach children how to be responsible by teaching them how to perform tasks by themselves. The present disclosure may teach children how to be responsible by teaching them how to conserve resources (e.g., conserve water by taking a shower of reasonable length). Additionally, the present disclosure may help children remember various steps and tasks by guiding the children in an easy-to-understand manner. The present disclosure may provide benefits to parents as well, including time savings and the comfort of knowing that their child is being guided during the task. Various descriptions herein may describe children performing tasks, for example, tasks in the bathroom. However, it should be understood that the systems, methods, routines and/or techniques described herein could be applied to other situations where any person may benefit from being guided during a task. For example, an obsessive compulsive person may benefit from this disclosure by being guided to only wash their hands for appropriate amounts of time. Therefore, any descriptions herein that describe children may be expanded to cover any person, and any descriptions that describe bathroom tasks may be expanded to cover any tasks that a person may perform, for example, on a somewhat regular schedule.

Figure 1:
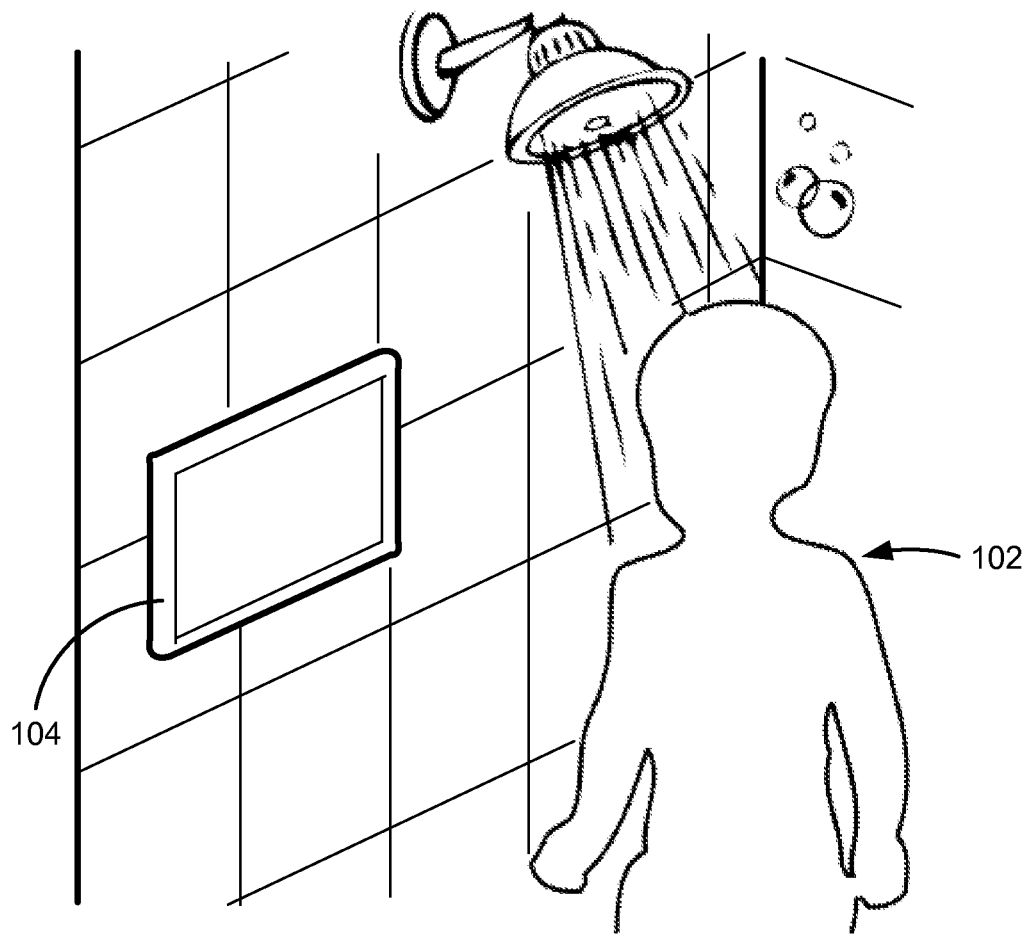
FIG. 1 depicts an illustration of an example environment (e.g., an ongoing shower) where tasks may need to be performed by a child, where one or more embodiments of the present disclosure may be useful in such an environment.

FIG. 1 depicts an illustration of an example environment (e.g., an ongoing shower) where tasks may need to be performed by a child, where one or more embodiments of the present disclosure may be useful in such an environment. As can be seen in FIG. 1, a child 102 (which is represented here by a cartoon cat) may be in an environment where the child 102 should perform various tasks, such as washing the back for a period of time, washing the belly for a period time, etc. FIG. 1 shows a guidance device 104, which may be placed or mounted in or near the environment where the tasks are to be performed. In the example of FIG. 1, guidance device 104 may be mounted on the wall of a shower stall (e.g., using suction cups, hooks or the like, as explained in more detail below). During the performance of various tasks, the child 102 may look at and/or listen for instructions from guidance device 104 in order to learn what the child should be doing or what the child should do next. The child may interact with the guidance device 104 (e.g., by pressing buttons, a touchscreen, etc.) to perform various functions such as starting a task, selecting options related to a task, etc. The guidance device may communicate information to the child 104 (e.g., via a screen, a speaker, lights, etc.) to guide the child to perform various tasks.

Figure 2:
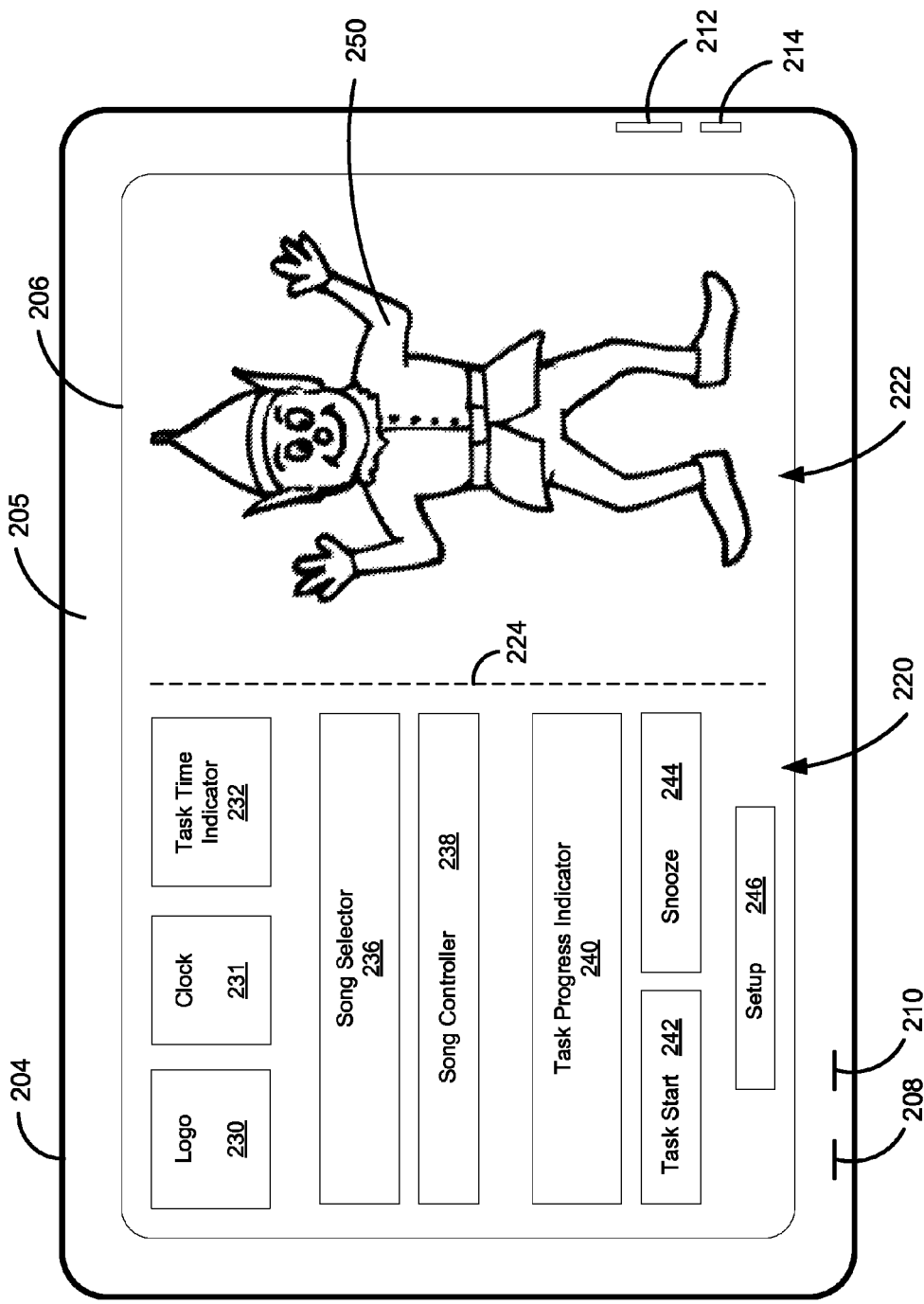
FIG. 2 depicts an illustration of an example guidance device, according to one or more embodiments of the present disclosure.

FIG. 2 depicts an illustration of an example guidance device 204, which may be similar to guidance device 104 of FIG. 1, for example. Guidance device 204 may include an outer shell 205, which may include one or more pieces of plastic, composite, metal or the like. The various potential forms (e.g., the shape, the inclusion of raised buttons and lights as opposed to a touchscreen) of the outer shell 205 may be further described with regard to the various ways that the guidance device 204 can be implemented in hardware, as explained below. Guidance device 204 may include a microphone 208 (e.g., for recording task instructions spoken by a parent or for receiving voice input from a user) and one or more speakers 210 (e.g., for instructing a child to perform a task, for identifying that a task is complete, for reminding a child of tasks yet to be completed, etc.). The microphone 208 and speaker(s) 210 may be embedded in the guidance device 204, and may be coupled to circuitry inside the guidance device 204. In this respect, the microphone and speaker(s) may communicate with software or routines described herein, for example, to communicate audio signals to the software or routines and/or to receive audio signals from the software or routines.

Guidance device 204 may include one or more radios and/or antennas (not shown, e.g., because they are embedded inside guidance device 204) to send and receive wireless signals. For example, guidance device 204 may include a WiFi antenna, a cellular antenna, a Bluetooth antenna and/or other type of antenna or mechanism to send and/or receive wireless signals. Guidance device 204 may include one or more memory card slots 212 that are configured to receive a memory card (e.g., SD, micro SD, or other similar memory cards) and communicate information from the memory card to the circuitry inside the guidance device 204 and vice versa. Guidance device 204 may include one or more data/communication ports 214 that are configured to communicate with an external device (e.g., a desktop computer or laptop) via a cord with one end plugged into the data/communication port 214 and the other end plugged into the external device. Data/communication port(s) 214 may operate according to a common data transfer communication protocol, for example, USB, FireWire, or the like.

Guidance device 204 may include a display area 206. Display area 206 may include one or more displays, screens, touchscreens, buttons (e.g., raised physical buttons, touch buttons, etc.), lights, indicators and the like. The various components of the display area 206 will be further described below with regard to various embodiments. The various potential forms (e.g., the inclusion of raised buttons and lights as opposed to touchscreen) of the display area 206 may be further described below with regard to the various ways that the guidance device 204 can be implemented in hardware.

Display area 206 may include one or more display segments, for example, display segments 220 and 222. FIG. 2 shows display segments 220 and 222 being separated by a divider 224; however, in various embodiments, a distinguishable divider may or may not be present. Different display segments (e.g., display segments 220 and 222) may serve different purposes. For example, in the embodiment of FIG. 2, display segment 220 may allow for various user controls and feedback, and display segment 222 may display instructional information to a user (e.g., a child). The following will describe one specific implementation of the display area, including two display segments, where each display segment serves particular purposes. However, it should be understood that the following description is just for explanatory purposes, and should not be used to limit the present disclosure. For example, display area 206 may have more or less than two display segments, and the display segments may be arranged in different locations than they are shown in FIG. 2 and as described below. Additionally, the components, features and the like explained with regard to a particular display segment may instead be part of any one of the other display segments. In some embodiments, display area 206 (e.g., in display segment 220 and/or display segment 222) may display a background or wallpaper (e.g., similar to a background/wallpaper of a computer or smartphone). The background/wallpaper may display behind the main features of the display segments (e.g., behind the buttons/indicators of display segment 220 and/or behind figure 250 of display segment 222). The background/wallpaper may be blank (e.g., black or a solid color) or it may include one or more images (e.g., scenes, animals, nature elements, etc.). In some embodiments, the guidance device may allow a user (e.g., a child) to change the background/wallpaper, for example, by touching the background a defined (e.g., specified in the settings) number of times (e.g., 4 times).

In the embodiment shown in FIG. 2, display segment 220 (e.g., the left display segment) may allow for various user controls and may provide feedback and/or progress to a user. Display segment 220 may be implemented as a number of buttons (e.g., raised physical buttons), lights, displays and indicators. Alternatively, display segment 220 may be implemented as a screen or touchscreen (e.g., as part of a larger touchscreen that makes up most or all of the display area 206). If display segment 220 is implemented as a touchscreen, the contents of display segment 220 may change depending on the "page" that the display segment 220 is displaying or the "mode" that the guidance device 204 is in. Various pages and modes will be described in more detail below. Display segment 220 may include a logo 230. Logo 230 may be, for example, the logo of a company that manufactures the guidance device 204 and/or an operating system and/or application that runs on the guidance device 230. Logo 230 may function as a "start button," for example, if the display segment 220 is implemented as a touchscreen. In these embodiments, if a user touches the logo 230, the display segment 220 may display a home page. Display segment 220 may include a clock 231, which may display a time of day, for example, a time set by a user or a time automatically configured via a satellite or internet connection with a time server.

Display segment 220 may include a task time indicator 232. The task time indicator 232 may indicate or display to a user (e.g., a child) the suggested total task time, which may be the total amount of time that the user should spend on the overall task (e.g., the total amount of time that a child should spend in the shower). This total task time may be approximately the summation of the amounts of time that the user spends on various sub-tasks (e.g., washing hair, washing arms, washing legs, etc.). The task time indicator 232 may inform a child about the amount of time that the child needs to concentrate on the overall task. This information may cause a child to concentrate more on the task, for example, because the child knows the overall task will not take an unreasonable amount of time. The task time indicator 232 may also allow a parent to confirm that the child will spend the appropriate amount of time performing the task. The total task time may be configurable, for example, by a child (e.g., a user without administrative or setup rights) and/or by a parent (e.g., a user with administrative or setup rights). In some implementations, only a user with administrative or setup rights (e.g., a parent) may change the total task time, for example, via a setup page as explained in more detail below. In some implementations, a user without administrative or setup rights (e.g., a child) may change the total task time, for example, by touching or pressing the task time indicator 232. In some implementations, a user without administrative or setup rights may only be able to change the total task time within a range, for example, a range set by a user with administrative rights.

Display segment 220 may include a song selector 236 and a song controller 238. Song selector 236 may allow a user (e.g., a child) to select from a plurality of songs that may play during the performance of the task (e.g., during a shower) and the operation of the guidance device 204. In one example implementation, song selector 236 may include a plurality of buttons (e.g., "Song 1", "Song 2", etc.) that allow a user to select a song out of a plurality of preselected songs, or a playlist out of a plurality of playlists, or a song genre out of a plurality of preselected song genres. A different preselected song, playlist or song genre (e.g., nursing rhyme songs, older-kid songs, etc.) may be assigned to each button. Then, a user (e.g., a child or parent) may select one of the buttons before or during the task to indicate the song, playlist or genre that should play during the task. A song selector 236 with multiple buttons may provide benefits to families with multiple children. For example, a parent may be able to assign song(s) appropriate for a younger child to button 1, for example, and song(s) appropriate for an older child to button 2. The assignment of songs, playlists or genres to buttons may be described in more detail below with regard to the setup page.

Song controller 238 may allow a user (e.g., a child) to alter the playback of the song that is selected (e.g., via song selector 236) for playback during the task. Song controller 238 may include one or more buttons, for example, a play button, a pause button, a stop button, a back-one-song button, a forward-one-song button, a backwards button and a fast-forward button. By interacting with the song controller 238, a user may move forward or backward in a current song, or the user may change the song to a previous or next song (e.g., previous and next songs in a playlist, or in a genre song list).

Display segment 220 may include a task progress indicator 240, which may indicate to a user (e.g., a child) the progress that the user has made in the overall task (and/or in various sub-tasks) and/or the amount of time or tasks that the user has yet to complete. Task progress indicator 240 may indicate the progress in the current subtask (e.g., washing hair) and/or it may indicate the progress in the overall task (e.g., taking a shower). Guidance device 204 may maintain one or more configurable time segments, where each time segment is associated with a subtask (e.g., washing hair). Time segments may be configured or setup by a user with administrative or setup rights, as explained in more detail below. When all of the time segments for all of the subtasks in a task are added together, they may approximately equal the total task time as explained above. Task progress indicator 240 may determine the progress of a current subtask by comparing the elapsed time since the start of the subtask to the total time segment allotted to the subtask.

Task progress indicator 240 may be implemented as one or more discrete lights, as a light bar, as a display module that is part of a larger screen or touchscreen. In one example implementation, task progress indicator 240 is a plurality of discrete lights (e.g., translucent plastic shapes with LED lights below them), for example, where each light indicates a sub-task (e.g., washing hair) out of the overall task (e.g., taking a shower). When it is time for the user to move on to the next subtask (e.g., meaning that the previous subtask should have been completed), the light for the previous sub-task may light up, indicating the sub-task's completion. In this respect, the number of illuminated lights (vs. off lights) of the task progress indicator 240 may indicate the tasks that should have been completed and the overall task progress. The same concept just described may be implemented as digital icons (e.g., indicating sub-task completed vs. uncompleted), for example, if the display segment 220 is implemented as a touchscreen. In some example implementations, the task progress indicator 240 may indicate detailed progress about the current subtask (e.g., washing hair), for example, the amount of time spent or left in the current sub-task. In one specific implementation, the task progress indicator may include a progress bar that "fills up" as the time allotted to the subtask passes. The progress bar may be implemented by a digital display or a series of LED lights that appear to fill up a light bar as the LEDs subsequently light up during the sub-task time.

Display segment 220 may include a task start button 242. A user may touch or press the task start button 242 to indicate that the user is starting the overall task (e.g., taking a shower). The task start button 242 may indicate to other components of the guidance device 204 that the task has begun. For example, the task start button 242 may signal to a circuitry and/or software within the guidance device that the task has begun, and the circuitry and/or software may begin to perform various runtime algorithms, routines or the like. As the task begins and/or progresses, the circuitry and/or software may indicate start/progress information to various other components of the guidance device 204, for example, the song controller 238 (e.g., to start playback of the selected song) and/or the task progress indicator 240 (e.g., to update the overall progress and/or sub-task progress).

Display segment 220 may include a snooze button 244. Snooze button 244 may allow a user (e.g., a child) to indicate that the user would like additional time for the current sub-task (e.g., washing arms). The snooze button 244 may indicate to other components of the guidance device 204 that the amount of time allotted to the sub-task (and perhaps the overall task time) should be tolled or extended. As one specific example, if a child wanted an extra 30 seconds to wash their arms, they could press the snooze button 244, and the guidance device 204 may delay moving to the next sub-task by 30 seconds. The delay time(s) associated with the snooze button 244 may be configured, for example, by a user with administrative or setup rights. The snooze button 244 may prevent a user (e.g., a child) from repeatedly delaying the progress of a sub-task or overall task. For example, the guidance device 204 may implement a maximum number of snoozes, e.g., allowing a child to use the snooze button no more than X (integer) times per overall task or sub-task. The maximum number of snoozes (per overall task and/or per sub-task) may be configured, for example, by a user with administrative or setup rights. Once the maximum number of snoozes have been used up, the snooze button 244 may have no effect (even if pressed) during the remainder of the overall task (if the maximum is per task) or during the remainder of the sub-task (if the maximum is per sub-task). If the display segment 220 is implemented as a touchscreen, the snooze button 244 may disappear (or turn red or some other color, or fade) once the maximum number of snoozes have been used up. The snooze button 244 may help to conserve resources (e.g., water), for example, by forcing a user (e.g., a child) to stick to a maximum overall task time that is reasonable (e.g., a reasonable shower time).

In the embodiment shown in FIG. 2, display segment 222 (e.g., the right display segment of display area 206) may display instructional information to a user (e.g., a child). Display segment 222 may include a figure 250 that may provide information to a user regarding which body parts the user should be concerned with during a particular sub-task. The figure may be any type of human (e.g., boy, girl, etc.), doll, animal, stuffed animal (e.g., a Teddy Bear), fanciful being (e.g., clown, leprechaun, etc.) or the like that a user (e.g., a child) can relate to. For example, the figure 250 may have body parts (e.g., 2 legs, 2 arms, etc.) that are similar to a child such that child can follow along by performing tasks on the child's own corresponding body parts. The figure 250 may be shown or displayed in a simplified format (e.g., without a high level of detail), for example, such that it is clear to a child which body parts on the figure correspond to the child's own body parts. In some embodiments, the guidance device may allow a user (e.g., a child) to change the figure (e.g., before the start of a task or on-the-fly during a task). For example, a child may touch (e.g., a certain number of time) the figure (or a button or touchscreen), and the figure may change. As a specific example, the figure may start as an elf and then when a child touches the figure/button/touchscreen 3 times, the figure may change to a Teddy Bear.

In some embodiments, the figure 250 may not be a complete being (e.g., complete human, animal, etc.), and may instead be a part of a being, for example, so that the task is focused on a certain body part and the instructions related only to that task centered around that body part. For example, the figure could be a set of lips, and the guidance device 204 may instruct a teenager (or pre-teen), for example, to put on makeup by instructing the teenager to apply different colors to different parts of the lip. As another example, the figure may be a set of teeth, and the guidance device 204 may guide a child through the task of brushing teeth. For example, the guidance device may progress through the sub-tasks of first brushing the upper right molars, then brushing the upper left molars, then brushing the upper left incisors, etc. In this example, the guidance device may emit an instructional sound that guides a child as to proper brushing technique (e.g., "Don't press too hard" or "Make sure to hold your toothbrush at an angle with a circular motion"). In this example, the figure may also include a toothbrush (or various brushes at various orientations) and the figure may show (e.g., by lighting up the appropriate brush) the correct positioning of the brush relative to the teeth. In some embodiments, the figure may not include any parts from a being. For example, the guidance device may guide a child to learn how to plant a garden. The figure 250 may include representations of plants, plant pots, garden dimensions or the like. The guidance device may guide a child (or older person) through how to plant the garden with figures/images and then provide information about when to water and how much to water. As a specific example, the figure 250 may be a plant, and the guidance device may show (e.g., by lighting up various parts of the plant) how to handle the plant and where to water it (e.g., watering at the base of the plant as opposed to watering the leaves). As should be understood after referencing the foregoing examples, the present disclosure applies more broadly than just guiding children to wash body parts. It should be understood that the figure 250 may include various items such as a whole body, body parts and/or non-being items (e.g., toothbrush, tools, plants, etc.), and the guidance device may guide a person to perform various tasks (e.g., bathroom tasks, personal hygiene tasks, creative and constructive tasks, etc.). Additionally, the instructional sounds emitted by the guidance device may include instructions that indicate more than just the start of a sub-task (e.g., instructional sounds may explain proper technique, provide encouragement, etc.).

The figure 250 may be implemented as an image on a screen or touchscreen, e.g., if display segment 222 is implemented as a touchscreen. Alternatively, figure 250 may be implemented as a physical piece (or pieces). In one example implementation, the figure 250 may be formed out of a molded plastic piece of transparent or translucent plastic. In some embodiments, the guidance device 204 may allow for interchangeable or removable figures. For example, a user may be able to remove a first molded plastic figure (e.g., a leprechaun) and replace it with a second molded plastic figure (e.g., a cartoon cat). In this respect, removable figures may be interchanged in a similar manner to the way designer (e.g., colorful) smartphone cases can be interchanged. Physical, removable figures 250 may be attached to the guidance device 204 by pegs, clips, hooks or other attachment mechanisms. If the figure 250 is implemented as an image on a screen or touchscreen, the image (e.g., a cat, clown, etc.) for the figure 250 may be changed, for example, selected by a child by touching the figure 250, or selected by a user with administrative or setup rights (e.g., a parent). The image for the figure 250 may be selected from a number of pre-loaded image options, e.g., factory loaded images or user loaded images.

Figure 3B:
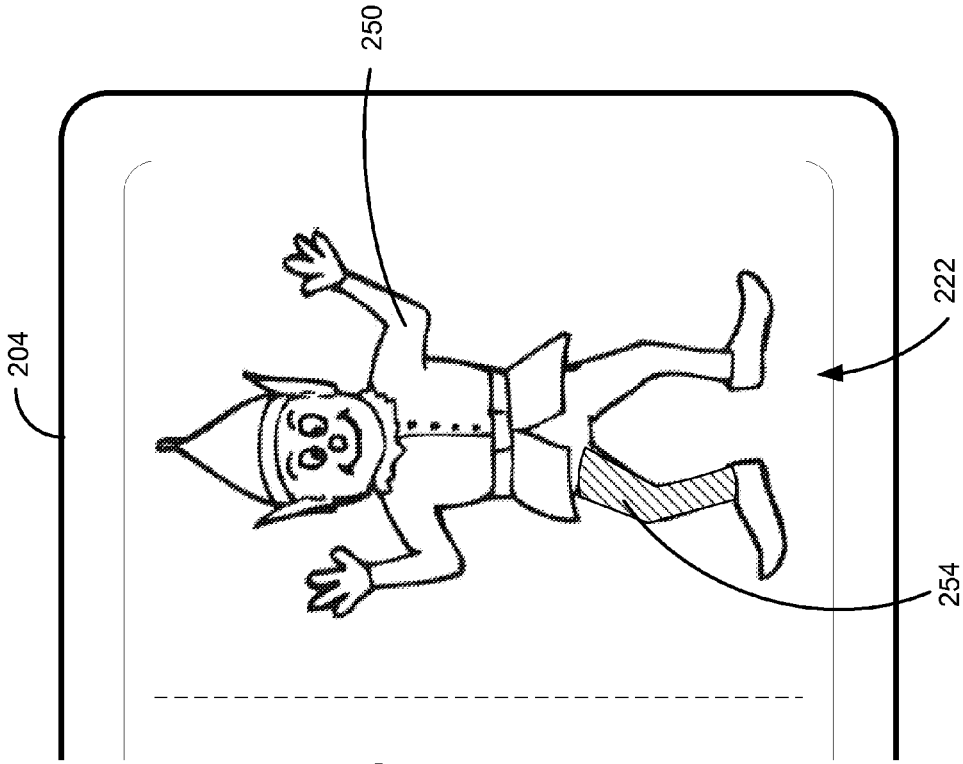
FIG. 3B depicts an illustration of a portion of an example guidance device with a part of a figure indicated, according to one or more embodiments of the present disclosure.
Figure 3A:
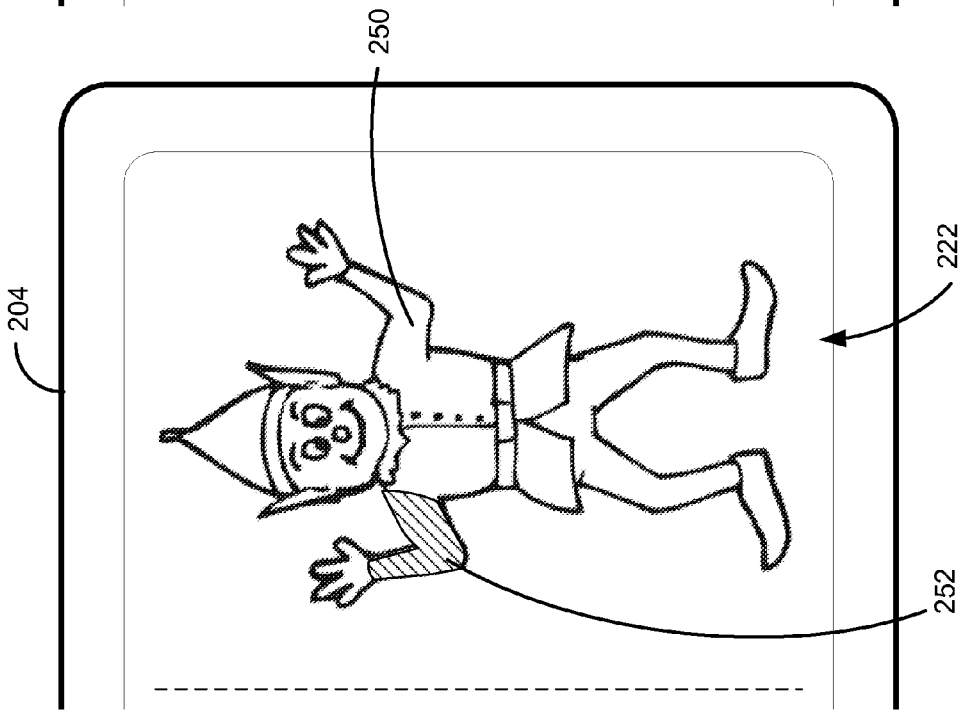
FIG. 3A depicts an illustration of a portion of an example guidance device with a part of a figure indicated, according to one or more embodiments of the present disclosure.

The figure 250 may indicate or accentuate one or more parts (e.g., body parts) of the figure. For example, during a particular sub-task, as explained more herein, one or more body parts of the figure 250 may light up to show a user (e.g., a child) which body parts the child should concentrate on at that time. As one specific example, and referring to FIG. 3A, during a particular time segment/sub-task, a child may look at the guidance device 204 (in particular, display segment 222) and see figure 250 with a first body part 252 (e.g., an arm) indicated (e.g., lit up or blinking). The child may then realize (e.g., with the additional help of an instructional sound) that he/she should wash his/her right arm. As another specific example, and referring to FIG. 3b, when the next time segment/sub-task arrives, a child may look at the guidance device 204 (in particular, display segment 222) and see figure 250 with a second body part 254 (e.g., a leg) indicated (e.g., lit up or blinking). The child may then realize (e.g., with the additional help of an instructional sound) that he/she should wash his/her right leg. Guidance device 204 may indicate parts of figure 250 in various ways. As one example, if figure 250 is a molded plastic piece of transparent or translucent plastic, the guidance device 204 may include a number of LED lights under the plastic figure 250. In particular, there may be one LED under each body part that needs to be individually indicated at some point. As another example, if display segment 222 is implemented as a screen/touchscreen, figure 250 may be a digital image on the screen/touchscreen and various parts of the figure 250 may be indicated at various times by changing the color, pattern, brightness, contrast, etc. of the body part, or by causing the body part to blink/flash. In some embodiments, different parts of figure 250 may be indicated or lit up in different colors, for example, arms may be indicated in red, face may be indicate in yellow; private parts may be indicated in blue, etc. In some embodiments, if the display segment 222 is implemented as a screen/touchscreen, figure 250 may be shown as performing the sub-tasks along with the child. For example, if the guidance device is guiding a child to get dressed, the figure 250 may get dressed simultaneously with the child. If the current sub-task is guiding a child to put on socks, the figure may be shown (e.g., the figure image may change or the figure may be animated) as putting on socks. As another example, if the guidance device is guiding a child to take a shower and the current sub-task is washing arms, the figure may be shown washing its arms.

In operation, a user (e.g., a child) may start (e.g., by pressing task start button 242 or by a voice activated command) the operation of the guidance device 204 at approximately the same time as the user starts a task (e.g., taking a shower). In some embodiments, as explained in more detail below, pressing the task start button 242 may automatically start a task related to the guidance device 204. For example, pressing the start button may automatically start water to run through a shower head. Additionally, when a user presses the task start button 242, a song (e.g., selected using song selector 236) may start to play (e.g., if the song is not already playing). During the operating of the guidance device 204, the user may alter the playback of the song or skip to a different song, for example, using the song controller 238. When the user presses the task start button 242, a first configurable time segment associated with the first sub-task (e.g., washing hair) may begin to tick down. Additionally, when the user presses the task start button 242, the guidance device 204 may emit (e.g., via speaker(s) 210) a first instructional sound instructing the child to perform the first sub-task (e.g., "Okay, Tommy, let's start by washing your hair"). The guidance device 204 may store one or more instructional sounds, for example, recorded voice samples from parents (e.g., input using microphone 208) and/or factory-preset voice/instructional sounds. The guidance device 204 may also emit instructional sounds that guide a child regarding proper technique (e.g., "Don't rub your scalp too hard while washing your hair"). Additionally, when the user presses the task start button 242, one or more body parts (e.g., the hair) on figure 250 may be indicated (e.g., lit up or blinking). As the first time segment ticks down, the task progress indicator 240 may show the progress of the current sub-task, for example, by showing how much time has expired and/or how much time remains for the current sub-task. Once the first time segment is over, the task progress indicator 240 may show an indication that the first task has been completed, for example, by illuminating a light or displaying an icon corresponding to the first sub-task. At various times during a sub-task (e.g., at the end of the sub-task time), the guidance device 204 may emit an instructional sound that indicates that the sub-task is over and/or provides encouragement to the child (e.g., "Good job! You did great!!!").

Then, a second configurable time segment associated with a second sub-task (e.g., washing right arm, or both arms) may begin to tick down. The guidance device 204 may emit a second instructional sound instructing the child to perform the second sub-task (e.g., "Okay, Tommy, time to wash your arms"). Additionally, one or more body parts (e.g., the arms) on figure 250 may be indicated (e.g., lit up or blinking). As the second time segment ticks down, the task progress indicator 240 may show the progress of the current sub-task, for example, by showing how much time has expired and/or how much time remains for the current sub-task. Once the second time segment is over, the task progress indicator 240 may show an indication that the second task has been completed, for example, by illuminating a light or displaying an icon corresponding to the second sub-task. The guidance device 204 may continue its operation for additional time segments/sub-tasks in a similar manner. The guidance device 204 may progress through all of the sub-tasks, emitting instructional sounds at each sub-task and indicating the appropriate body part on figure 250 at each sub-task. After the final time segment/sub-task is over, the guidance device may have completed its operation for a particular overall task, and the guidance device may transition to an off, waiting, or sleep mode until a user indicates that another task should be started. In some embodiments, upon completion of the overall task, the guidance device may provide end-of-task feedback (e.g., via display area 206 and/or via speaker(s) 210). For example, the guidance device may emit a feedback sound such as: "You took X [integer] minutes, and completed Y [integer] sub-tasks. I hope you had a good shower!" In some embodiments (e.g., if the figure 250 is implemented via a touchscreen or digital display), once the overall task is complete, the figure 250 may fade away.

The guidance device may operate in various modes, for example, where different "pages" are displayed to the user in different modes, and where the guidance device operates differently in different modes. Two example modes that may work together in an example embodiment of the present disclosure may be a "runtime mode" and a "setup mode." The runtime mode may be a mode that the guidance device operates in when a user (e.g., a child or other user without administrative or setup rights) is being guided to perform a task. When the guidance device is operating in runtime mode, the display segment 220 may display a page (e.g., a homepage) that is similar to the display segment 220 shown in FIG. 2. When the guidance device is operating in runtime mode, the display segment 220 may contain buttons that a user (e.g., a child) may interact with during the performance of a task. The runtime mode may be referred to as the normal operating mode. In this respect, the guidance device may operate most of the time in the runtime mode, and may only switch to a different mode (e.g., the setup mode) when a user with administrative or setup rights causes the guidance device to switch modes (e.g., by entering a password). The descriptions above that explain how the guidance device may progress through sub-tasks/time segments, while communicating instructional sounds and indicating figure parts may generally apply to the runtime mode of the guidance device.

The setup mode may be a mode that the guidance device operates in that allows a user (e.g., a parent or other user with administrative or setup rights) to change various settings that may cause the guidance device to operating differently (e.g., during its operation in the runtime mode). A user may enter the setup mode in various ways. For example, in some embodiments, display segment 220 may include a setup button 246. A user (e.g., a parent) may press or touch the setup button 246 and then (e.g., after the user enters a password), the guidance device may transition into the setup mode. In some embodiments, once the guidance device starts the overall task (e.g., in response to a user pressing start task button 242), the setup button 246 may be locked and/or may fade and/or may change color (e.g., to gray or some other color) and/or may disappear. If the display segment 220 is implemented as a touchscreen, the display segment may switch from displaying a "homepage" (e.g., the page shown in display segment 220 of FIG. 2) to displaying a "main setup page." When the guidance device 204 is in setup mode, it may display a "main setup page" or various other setup pages depending on how the setup mode is configured. Various configurations and pages of the setup mode will be explained in more detail below.

As another example of how a user may enter the setup mode, a user may use a separate (e.g., a desktop computer, laptop, etc.) computing device to communicate with the guidance device 204. For example, the separate computing device may be in communication with the guidance device via a cord (e.g., a USB cord connected to data/communication port 214) or wirelessly (e.g., via Bluetooth). The separate computing device may run a software program associated with the guidance device, whereby a user can interact with the software program using the separate computing device, and such interaction causes the computing device to communicate with the guidance device to alter various settings. If a user accesses the setup mode of the guidance device via a separate computing device, the display segment 220 may remain as it appears in runtime mode, or it may be blank, or it may inform the user that the device is connected to a remote computing device, or it may display some other message. If a user accesses the setup mode via a separate computing device, the user may navigate through the various setup pages using the separate computing device. Various configurations and pages of the setup mode will be explained in more detail below.

In some embodiments, the guidance device may not have a setup "mode" per se. In these embodiments, the guidance device may have one or more switches, dials, or other semi-physical input means that allow a user to alter various setting quickly without navigating setup pages.

Figure 4A:
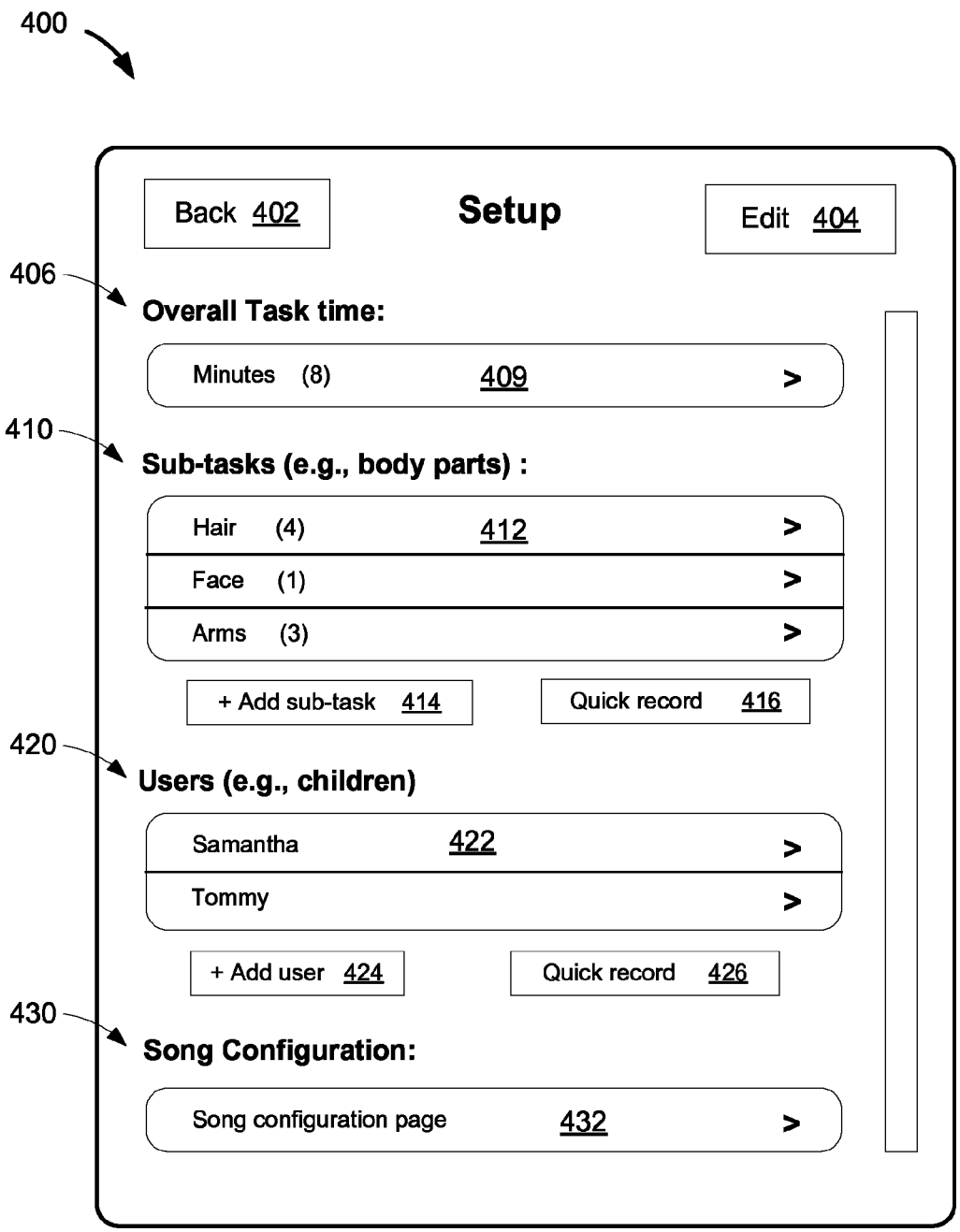
FIG. 4A depicts an illustration of an example setup page, according to one or more embodiments of the present disclosure.
Figure 4B:
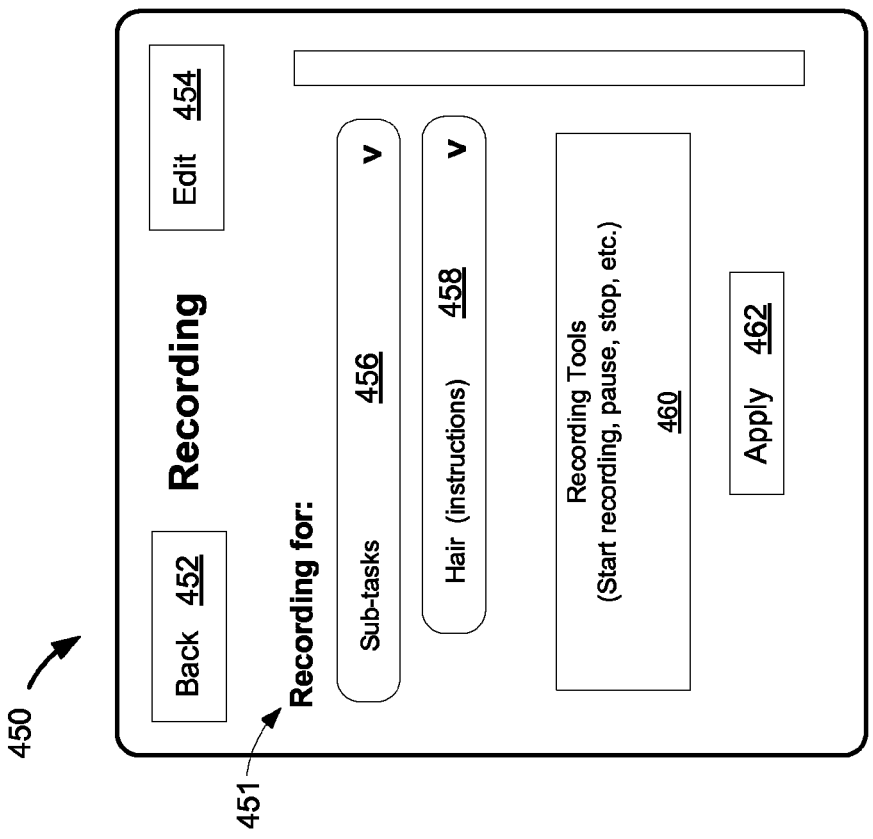
FIG. 4B depicts an illustrations of an example setup page, according to one or more embodiments of the present disclosure.
Figure 4C:
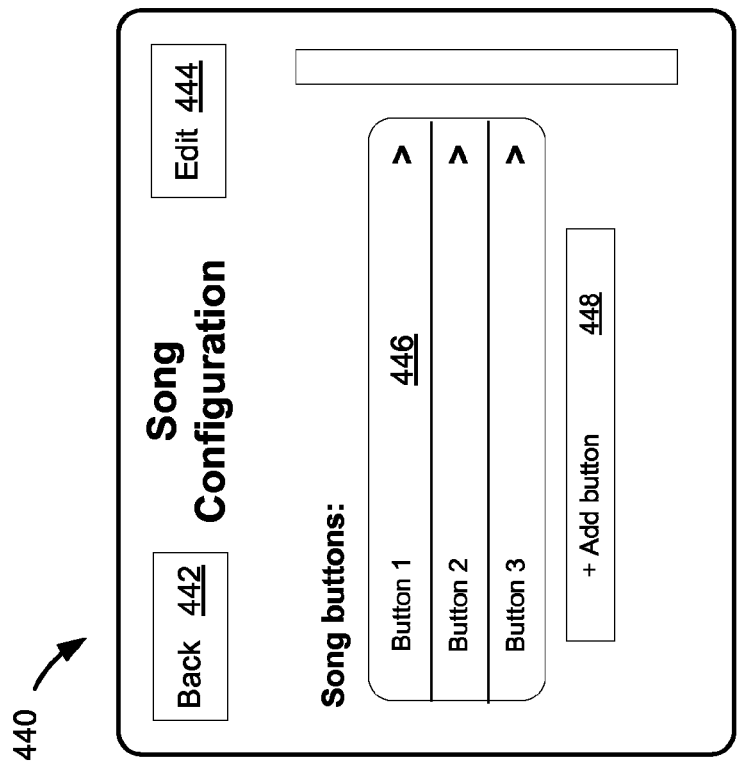
FIG. 4C depicts an illustrations of an example setup page, according to one or more embodiments of the present disclosure.

The guidance device may maintain or be associated with various pages (e.g., the main setup page and various other setup pages). As explained above, the various setup pages may be displayed to a user (e.g., a parent or other user with administrative or setup rights) via the guidance device (e.g., via display segment 220) or via a separate computing device. Various setup pages may allow a user to select various setting and enter various pieces of information. The guidance device may store these settings and information, and may use the setting and information during runtime mode. FIGS. 4A, 4B and 4C depict illustrations of example setup pages, which are described in more detail below.

FIG. 4A depicts illustration of an example setup page 400, for example, a main setup page. In an example implementation, setup page 400 may be displayed to a user when a user enters the setup mode. Setup page 400 may be displayed via the guidance device (e.g., via display segment 220) or via a connected separate computing device (e.g., a laptop). Setup page 400 may allow a user to select various setting, enter various pieces of information and/or allow a user to navigate to other setup pages (e.g., the setup pages of FIGS. 4B and 4C). Setup page 400 may include a back button 402, which may cause the guidance device to return to a previously displayed page, for example, a page related to the runtime mode. In some embodiments, pressing the back button 402 may also save the current settings as shown in the setup page 400. Setup page 400 may include an edit button 404. Pressing the edit button 404 may "unlock" the setup page 400 so that a user may interact with the various selectable features of the setup page 400. In some embodiments, the setup page 400 may not include an edit button and a user may interact with the various selectable features of the setup page 400 as soon as setup page 400 is displayed. In some embodiments, setup page 400 may include a "save" button (not shown), which may cause the current setting displayed on setup page 400 to be saved (e.g., to the memory of the guidance device). In some embodiments, the current setting shown on setup page 400 may automatically save, for example, at defined intervals of time.

Setup page 400 may include one or more settings sections, for example, settings sections 406, 410, 420 and 430. Setup page 400 may include a setting section 406 that allows a user to change settings related to the overall task, such as the overall task time. As one example, a user may press a button 409 (as shown in FIG. 4A) to select a time period for the overall task (e.g., for the total shower). Pressing button 409 may bring up a selection tool such as a drop down menu, selector, slider or the like that allows a user to select a period of time. Once the user selects a period of time, the selection tool may disappear and the selected amount of time may appear on the button 409 (e.g., shown by a "8", meaning 8 minutes, in the example of FIG. 4A).

Setup page 400 may include a setting section 410 that allows a user to change settings related to various sub-tasks (e.g., washing hair, face, arms, etc.). For example, a user may press a button (e.g., button 412 as shown in FIG. 4A) related to a particular sub-task to change various settings related to the sub-task. Sub-task buttons (e.g., button 412) may allow a user to change the amount of time that a user (e.g., a child) should spend on the associated body part (e.g., hair). In this respect, configurable time segments for each sub-task may be assigned. Sub-task buttons (e.g., button 412) may allow a user to change the time for a sub-task in various ways. For example, a pressing the sub-task button may bring up various information entry tools, such as a text entry tool, a selector, drop down menu, slider or the like that allows a user to enter a time value (e.g., 4 minutes). Time values for sub-tasks may be set as numbers (e.g., 4 minutes) or percentages/fractions (10%) of the overall task time. As one specific example, pressing sub-task button 412 may cause a slider to display, and the user may interact with the slider to select a percentage. As the user changes the percentage, the time for the sub-task may be automatically scaled to the overall task time. In some embodiments, the guidance device may ensure that all of the sub-task times add up to equal the time of the overall task. For example, if the overall task time is 8 minutes, then a user may wash her hair for 4 minutes, her face for 1 minute and her arms for 3 minutes. Therefore, if one value is changed (e.g., the overall time, or a sub-task time), other values may be automatically modified to maintain this balance.

Setting section 420 may allow a user (e.g. a parent) to enter a recording for the various sub-tasks (e.g. "Time to wash your hair!"). The sub-task recordings may be used when the guidance device is operating in runtime mode to instruct a user/child to perform a sub-task. A recording page (e.g., FIG. 4C) may be used to record the sub-task recordings, and the recording page may be accessed via the sub-task's button (e.g., button 412) or via a quick record button 416. The recording page is described in more detail below. Settings section 410 may allow a user to add or remove sub-tasks. For example, a user may be able to add a subtask by pressing an "add sub-task" button 414. In some embodiments, various sub-tasks may be required and various subtasks may be optional. For example, if a child should always wash their armpits, the "wash armpits" sub-task may be required (e.g., not removable). As another example, if a child only washes their hair every other shower, the "wash hair" sub-task may be optional (e.g., removable), or set to be included/not included as a sub-task according to a weekly scheduling function.

Setup page 400 may include a setting section 420 that allows a user to change settings related to various users (e.g., various children in the household). For example, a user (e.g., a parent) may press a button (e.g., button 422 as shown in FIG. 4A) related to a particular user/child to change various settings related to the user/child. User buttons (e.g., button 422) may allow a user (e.g. a parent) to change/enter the name of the user (e.g., Samantha). Additionally, setting section 420 may allow a user (e.g. a parent) to enter a recording of the user's name (e.g. "Samantha"). The recorded user's name may be used when the guidance device is operating in runtime mode to instruct a user/child to perform a sub-task. A recording page (e.g., FIG. 4C) may be used to record the user's name, and the recording page may be accessed via the user/child's button (e.g., button 422) or via a quick record button 426. The recording page is described in more detail below.

Settings section 420 may allow a user to add or remove users (e.g., children). For example, a user may be able to add a user by pressing an "add user" button 424. Each button (e.g., button 422) may appear for each added user, which may allow for each user to have his/her own set of settings (e.g., his/her own profile). This feature of allowing a variable number of users may be beneficial to a household with multiple children that have different names and/or different needs with regard to performing tasks. For example, the user buttons for the different users may allow for different name and/or sub-task recordings for the different users. As another example, the user buttons for the different users may allow for different overall task and corresponding sub-tasks for the different users. In some embodiments, the user buttons may allow a parent to select a whole different set of settings (e.g., settings from the settings section 406 and/or 410 and/or 430) for each user. In this respect, each user may have a personal overall task and corresponding overall task time, personal sub-tasks (with personal sub-task times), personal songs, and optionally, other personal settings. In some embodiments, when the guidance device is operating in runtime mode, the display area 206 may include a button that allows a user (e.g., a child) to select which user is performing the task, and then the guidance device may select the associated set of settings for that user.

Setup page 400 may include a settings section 430 that allows a user to change settings related to songs. For example, settings section 430 may allow a user to select songs, genres and/or playlists that should be assigned to various song buttons that may be displayed (e.g., by song selector 236) during the runtime mode. Settings section 430 may include a song configuration button (e.g., button 432) that may allow a user to navigate to a song configuration page (e.g., the page of FIG. 4B).

FIG. 4B shows an illustration of an example song configuration page 440. Song configuration page 440 may include a back button 442 (e.g., that operates similar to back button 402) and an edit button 444 (e.g., that operates similar to edit button 404). Song configuration page 440 may include one or more song buttons (e.g., button 446). Song buttons may allow a user to select a song, song genre or playlist of songs to assign to the particular song button. The songs that are assigned to various song buttons may be stored locally on the guidance device, or they may be accessed via an online music service (e.g., a third party subscription service). Songs that are stored locally on the guidance device may have been stored on the guidance device at the time of production or pre-loaded by the manufacturer through other means. Alternately, songs may be downloaded to the guidance device, for example, from a separate computing device or from an online music store (e.g., an online music store where individual songs may be purchased). In order for the guidance device to access an online music service or an online music store, the guidance device may use an embedded antenna (e.g., a WiFi antenna, a cellular antenna, a Bluetooth antenna and/or other type of antenna or mechanism to send and/or receive wireless signals) to connect to the internet (e.g., via a home network or via a cellular provider network). In operation, a user (e.g., a parent) may select a song button (e.g., Button 1—446) and a song selector tool may display. For example, the song selector tool may bring up an interface that allows a user to browse through the user's music collection (e.g., stored on a computer or in the cloud). The interface may allow a user to select a single song, a genre of songs or a playlist of songs to assign to the button (e.g., Button 1).

Song configuration page 440 may allow a user to add or remove buttons, e.g., buttons 1, 2, 3, 4 (Button 4 not shown). For example, a user may be able to add a button by pressing an "add button" button 448. For each button that is added, a user (e.g., a parent) may assign a song, song genre or playlist to that button. Then, each button may appear (e.g., via song selector 236) to a user (e.g., a child) during the runtime mode (e.g., during a shower).

FIG. 4C shows an illustration of an example recording page 450. A user (e.g., a parent) may navigate to the recording page in various ways, for example, by selecting a subtask button (e.g., button 412) or a user button (e.g., button 422), and then selecting an option to record an instructional sound for a sub-task or to record a name for the user. Alternatively, a user may navigate to the recording page more directly by selecting a quick record button (e.g., quick record buttons 416 or quick record button 426). A quick record button may cause the recording page 450 to display, and may also alter the filter section 451 (explained in more detail below). For example, if a user selects quick record button 416, filter section 451 may automatically be altered such that button 456, for example, is selecting "Sub-tasks". Then the user would just have to select which sub-task (e.g., button 458), for example, before recording (e.g., via recording tools 460).

Recording page 450 may include a back button 452 (e.g., that operates similar to back button 402) and an edit button 454 (e.g., that operates similar to edit button 404). Recording page 450 may include recordings tools 460 and a filter section 451. Recording tools 460 may include various controls that indicate to a user that recording should be started, paused, stopped, etc. Recording tools 460 may include a start button, a pause button, a stop button and the like. Recording tools 460 may indicate to software (e.g., in the guidance device or on a connected separate computing device) that the software should start (stop, etc.) accepting audio information from a coupled microphone (e.g., microphone 208). The software may then create a digital audio file and store that audio file (e.g., locally on the guidance device) for playback (e.g., through speaker(s) 210) during runtime mode (e.g., during the performance of a task).

Filter section 451 may allow a user to indicate which setting the recording should be applied to, for example, to which user, to which sub-task, etc. As one example, button 456 may allow a user to select between "sub-tasks" and "Users". Then, button 458 may allow a user to filter further, by selecting which sub-task (e.g., if sub-tasks is selected at button 456) or which user (e.g., if users is selected at button 456). In some embodiments, for example where each user has his/her own complete set of settings, the filter section 451 may include an additional user-selection button, for example, above button 456. In these embodiments, for example, a user (e.g., a parent) may first select a user (e.g., a child) using the user-selection button. Then the parent may use button 456 to select whether the recording should be applied to the user's name or a sub-task, then finally, the parent may use button 458 to select which sub-task the recording should apply to. After the filter section is set, the user (e.g., a parent) may interact with the recording tools (and a coupled microphone) to input a voice sample. The voice sample may be a child's name (e.g., Johnny) or an instruction to the child (e.g., "wash your arms now"), and assuming that the filter section 451 is configured correctly, the voice sample will be saved and associated with the correct setting. The recording page 450 may include an "apply" button 462 that allows a user to accept the recording and apply it to the setting as indicated in the filter section 451.

Figure 5:
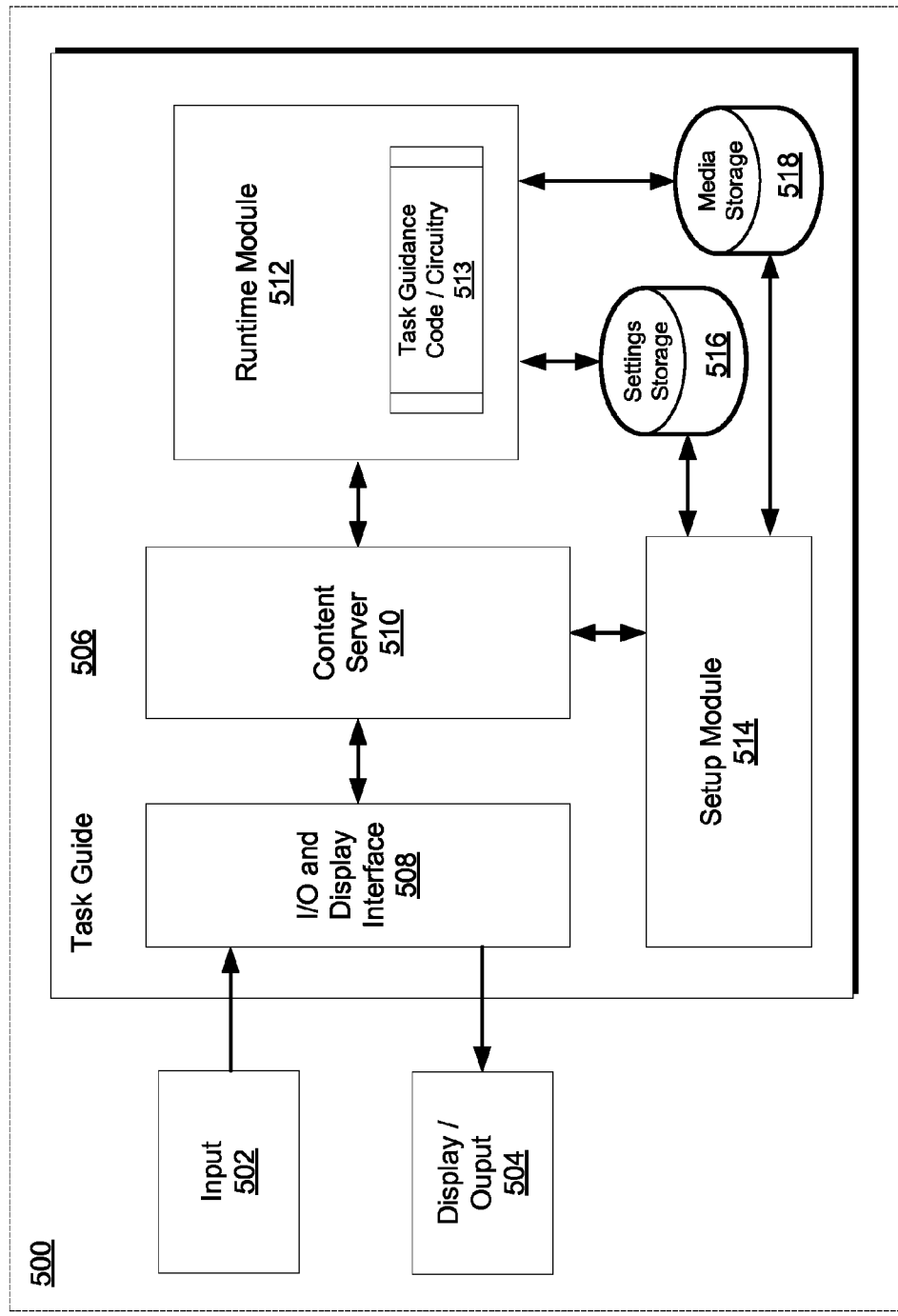
FIG. 5 depicts a block diagram showing example components, modules, routines, connections and interactions of an example guidance device, according to one or more embodiments of the present disclosure.

FIG. 5 depicts a block diagram showing example components, modules, routines, connections and interactions of an example guidance device 500, according to one or more embodiments of the present disclosure. Guidance device 500 may be similar to guidance device 204 of FIG. 2, for example. Guidance device 500 may include one or more input mechanisms (generally indicated by input 502). Input mechanisms may be, for example, a touchscreen (e.g., an information receiving function), buttons, a microphone, or other mechanism that allows a user to enter input to the guidance device. Guidance device 500 may include one or more display and/or output mechanisms (generally indicated by display/output 504). Display/output mechanisms may include, for example, a touchscreen (e.g., a display function), other types of screens, lights, speakers, or other mechanism that may be used to communicate information to a user.

Guidance device 500 may include a task guide 506. Task guide 506 may be a component of the guidance device 500 that performs the bulk of the various routines described herein and provides the bulk of the various features of the guidance device as described herein. Task guide 506 may be implemented as hardware/circuitry, software, middleware or some combination of these. As one specific example, task guide 506 may be a software application running on a mobile operating system. Task guide 506 may include one or more of the following: an I/O and display interface 508, a content server 510, a runtime module 512, a setup module 514, settings storage 516, and media storage 518. I/O and display interface 508 may receive information from input 502 and may format the received information in a way such that other component of the task guide 506 may understand and use the information. For example, I/O and display interface 508 may receive information as a result of a user (e.g., a child) touching a touchscreen (e.g., used to implement display area 206). I/O and display interface 508 may communicate information to display/output 504 and may format the information (previous to communicating) in a way such that display/output 504 can understand and use the information. For example, I/O and display interface 508 may communicate audio information to a speaker (e.g., 210), causing the speaker to emit an instructional sound (e.g., during a shower).

Content server 510 may operate as a buffer between the I/O and display interface 508 and various other modules of the task guide 506, such as the runtime module 512 and the setup module 514. Content server 510 may communicate with the various modules of the task guide 506, for example, to determine what information (e.g., which pages) should be displayed to the user. Content server 510 may determine which modules of the task guide 506 should currently control the display of the guidance device 500, for example, depending on which mode the guidance device is in (e.g., runtime mode as opposed to setup mode). Content server 510 may determine which modules of the task guide 506 should receive input information, for example, depending on which mode the guidance device is in.

Setup module 514 may run when the guidance device 500 is in setup mode, as explained in detail herein. When the guidance device is in setup mode, the setup module 514 may primarily control what is displayed (e.g., at display/output 504) and may primarily receive the input information received by the guidance device 500. Setup module 514 may communicate with settings storage 516, for example, to add, alter or remove various settings (e.g., various settings discussed above). As one specific example, a user may enter setup mode (e.g., by pressing setup button 246), and may change the overall task time (e.g., using button 409). This changed setting may then be saved by the setup module 514 to settings storage 516. Setting storage 516 may be, for example, a hard drive, flash memory device, solid state device, memory card, or any other type of non-volatile storage. Setup module 514 may communicate with media storage 518, for example, to add or remove various songs, song genres and/or playlists as discussed above. As one specific example, a user may enter setup mode (e.g., by pressing setup button 246), may navigate to the song configuration page (e.g., using button 432) and may assign a song to a song button, e.g., song button 1 (446). If the song is not already stored on the guidance device, the setup module 514 may download (e.g., by communicating with a wireless antenna) the song (e.g., from various online music stores) and save the song in media storage 518. The setup module 514 may also add or alter a setting (e.g., in settings storage 516) to associate the song with the correct song button. Media storage 518 may be, for example, a hard drive, flash memory device, solid state device, memory card, or any other type of non-volatile storage.

Runtime module 512 may run when the guidance device 500 is in runtime mode, as explained in detail herein. When the guidance device is in runtime mode, the runtime module 512 may primarily control what is displayed (e.g., at display/output 504) and may primarily receive the input information received by the guidance device 500. Runtime module 512 may communicate with settings storage 516, for example, to receive various settings that the runtime module may need to operate. For example, the runtime module 512 may receive settings regarding the number of sub-steps and the time allotted to each sub-step. Runtime module 512 may communicate with media storage 518, for example, to receive various media/audio files/data that the runtime module may need to operate. For example, the runtime module 512 may receive an audio file related to a child's name and/or an audio file related to a sub-task, such that the runtime module may use the audio files to instruct a child during a task (e.g., a shower).

Runtime module 512 may include task guidance code and/or circuitry 513. Task guidance code/circuitry 513 may include or implement various routines, algorithms and the like to guide a child to perform a task. For example, the task guidance code/circuitry 513 may control the operation of the guidance device during a task (e.g., a shower), for example, through steps such as instructing a child to perform a sub-task, lighting up a body part on the figure, ticking down the time segment associated with the sub-task, indicating progress in the sub-task and/or overall task, and moving to the next sub-task. More details about the routines and/or algorithms may be described in more detail below.

Certain embodiments of the present disclosure may be found in one or more methods for guiding a child to perform tasks. With respect to the various methods described herein and depicted in associated figures, it should be understood that, in some embodiments, one or more of the steps described and/or depicted may be performed in a different order. In some embodiments, one or more of the steps described and/or depicted may be performed substantially concurrently with other steps. Additionally, in some embodiments, a method may include more or less steps than are described and/or depicted.

Figure 6:
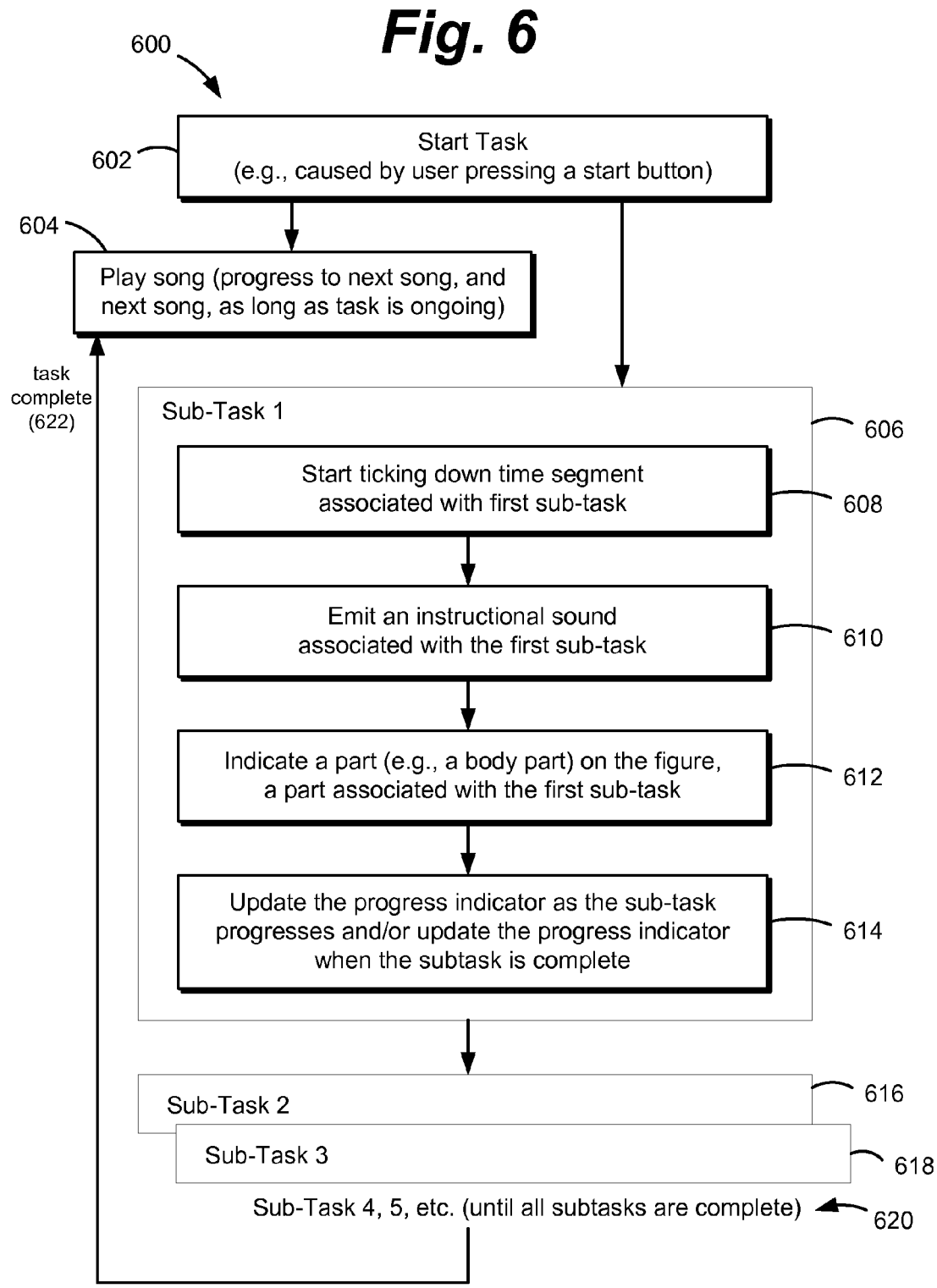
FIG. 6 depicts a flow diagram that shows example steps in a method for guiding a child to perform tasks, according to one or more embodiments of the present disclosure.

FIG. 6 depicts a flow diagram 600 that shows example steps in a method for guiding a child to perform tasks. In particular, FIG. 6 may show example steps that may be performed by a guidance device (e.g., guidance device 500 of FIG. 5), for example, performed by task guidance code/circuitry (e.g., 513) included within the guidance device. At step 602, the guidance device may start a task (e.g., start running routines, methods and the like related to a task, such as taking a shower). The guidance device may start the task in response to a user (e.g., a child) pressing a start button (e.g., task start button 242). At step 604, the guidance device may start to play a song. The song may have been previously assigned to a song button, and the user may have pressed the song button (e.g., part of song selector 236) to select the song, as described herein. The song may play to completion and then a next song may play. The next song may be assigned to a different song button, or the next song may be a subsequent song in a song playlist or song genre list. The songs may play until the overall task is complete (e.g., with completion being signaled by a task complete signal 622). At reference number 606, a first sub-task routine may start. The first sub-task routine may include multiple steps. At step 608, a time segment associated with the first sub-task may start to tick down and may continue to tick down until the sub-task time is expired. At step 610 the guidance device may emit an instructional sound associated with the first sub-task (e.g., "Okay, Tommy, let's start by washing your hair"). At step 612, the guidance device may cause a part (e.g., a body part) of the figure (e.g., figure 250) to light up or otherwise be indicated. The body part may be associated with the current sub-task (e.g., hair). At step 614, the guidance device may update the progress indicator (e.g., task progress indicator 240) as the sub-task progresses. The updating may reoccur multiple times as the time segment associated with the sub-task ticks down, until the sub-task is complete. The guidance device may update the progress indicator when the sub-task is complete (e.g., when the time for washing hair has expired).

At this point, the flow diagram 600 may progress to the next sub-task routine 616 (sub-task 2). The second sub-task routine may include multiple steps, for example, steps that are similar to the steps included in sub-task routine 606. When sub-task routine 616 is complete, the flow diagram 600 may progress to the next sub-task routine 618 (sub-task 3), and then to more subtask routines (generally indicated by reference number 620), until all of the sub-tasks are completed. At this point, the guidance device may generate a task complete signal (e.g., 622). Various components of the guidance device may use the task complete signal, for example, to reset and prepare to run another task.

Figure 7:
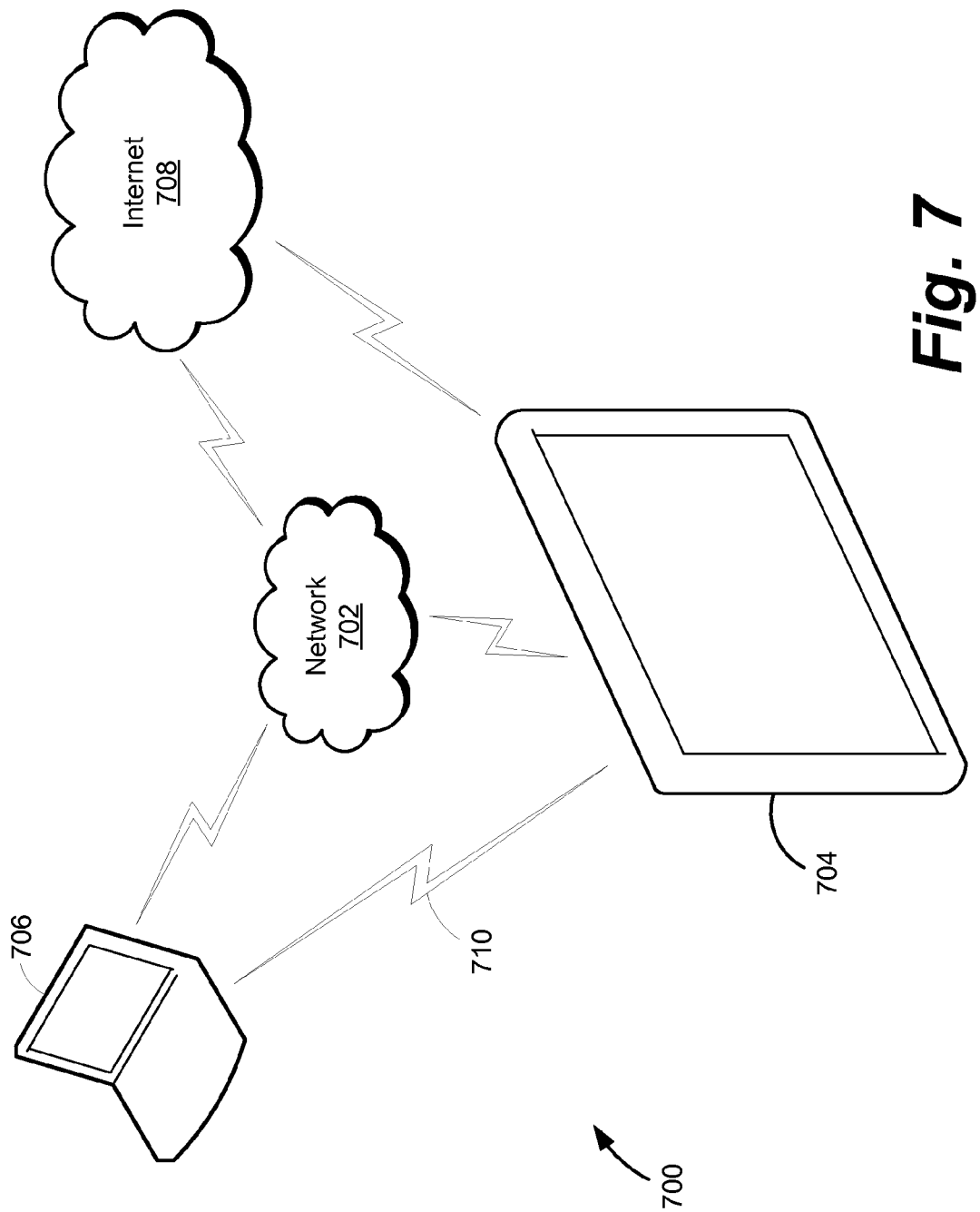
FIG. 7 depicts a block diagram showing example components, connections and interactions of a network setup, where one or more embodiments of the present disclosure may be useful in such a network setup.

FIG. 7 depicts a block diagram showing example components, connections and interactions of a network setup 700, where one or more embodiments of the present disclosure may be useful in such a network setup. It should be understood that the network setup 700 may include additional or fewer components, connections and interactions than are shown in FIG. 7. FIG. 7 focuses on a portion of what may be a much larger network of components, connections and interactions. Network setup 700 may include one or more guidance devices (e.g., guidance device 704). Guidance device 704 may be similar to guidance devices 104, 204 and/or 500 for example. Network setup may include one or more separate computing devices (e.g., laptop 706 and/or a desktop computer). Separate computing devices may be similar to the separate computing devices (e.g., connected via USB cord) described above that may be used to view and/or alter settings of the guidance device. Network setup 700 may include a network, for example, network 702. Network 702 may be a medium used to provide communication links between various devices, such as data processing systems, computers, servers, mobile devices and perhaps other devices. Network 702 may include connections such as wireless or wired communication links. In some examples, network 702 may include or be part of an intranet, a local area network (LAN) or a wide area network (WAN). Network 702 may be connected (e.g., via wires and/or wirelessly) to the internet 708. The internet 708 may be, for example, a worldwide collection of networks and gateways that use the Transmission Control Protocol Internet Protocol (TCP IP) suite of protocols to communicate with one another.

Guidance device 704 may be in communication with separate computing device 706, for example, via network 702 (e.g., via WIFI to a home router), via wireless communication link 710 (e.g., via Bluetooth connection) or via a wired connection (e.g., USB). Separate computing device may communicate with guidance device 704 to alter settings in the guidance device 704, as discussed in detail herein. Guidance device 704 may be in communication with the internet 708, for example, via network 702. Guidance device 704 may access an online music store or online music service (as discussed in more detail herein) by accessing the internet 708. In some embodiments, the guidance device will function properly without an internet connection. The guidance device may come pre-loaded with various songs and instructions sets (e.g., to perform popular task(s) such as taking a shower) and may come pre-loaded with voice samples for instructions. In this respect, the guidance device may function properly out of the box.

A guidance device (e.g., guidance device 104, 204, 500, 704) may be implemented in hardware in various ways. In other words, guidance device may include various types of outer shells (e.g., outer shell 205), various types of display areas (e.g., display area 206) and various types of internal circuitry, software, operating systems, applications and the like. In general, a guidance device may be implemented with a popular consumer mobile device (e.g., smartphone, tablet or the like) or with a custom created guidance device. In general, a guidance device may run a popular mobile operating system or a proprietary, customized or modified operating system (e.g., a customized ROM). The features described herein (e.g., the features of task guide 506) may be implemented by a software application running on the operating system or the features may be implemented by the operating system itself (e.g., if the operating system is a customized operating system). If the features are implemented by an application, the application may have been installed on the guidance device at the time of productions, or it may have been downloaded (e.g., via an application store) and installed by a user.

The outer shell of a guidance device may vary. For example, if the guidance device is implemented as a popular consumer mobile device (e.g., a tablet or smartphone), the outer shell may be whatever out shell (e.g., plastic, composite, etc.) is provided by the mobile device. Alternatively, the outer shell can be a waterproof or water resistant cover, case, shield or sleeve that fits over a popular consumer mobile device, or a waterproof or water resistant cover, shield or sleeve that otherwise receives a popular consumer mobile device therein or there-behind. If the guidance device is implemented as a custom created guidance device, the outer shell may look similar to the outer shell of a tablet, or it may have a different shape/structure. For example, the outer shell may be custom shaped and/or molded (e.g., out of plastic) to have a unique and/or fun shape and/or color (e.g., a shape/color attractive to children). As one specific example, the outer shell may be custom molded to be the shape of a flower, and the flower may be multicolored.

The display area may be implemented in various ways, e.g., depending on the type of device that is used to implement the guidance device. The display area may be implemented as primarily or completely a touchscreen (e.g., with close to or equal to 100% of the buttons, figures and other features being implemented via the touchscreen). This implementation may be used, for example, if the guidance device is implemented using a popular consumer mobile device (e.g., a tablet). The display area may be implemented, at least partially, as raised and/or physical buttons. For example, a heart-shaped button may act as task start button 242 and a music-note-shaped button may act as a music play button (e.g., as part of song controller 238). Also, as explained in more detail above, the figure (e.g., figure 250) may be implemented as a physical (e.g., plastic) figure or a digital (e.g., displayed on a touchscreen) figure. In some implementations, the display area may be completely implemented as physical buttons, physical features and the like (e.g., perhaps including some smaller digital displays). In other implementations, the display area may be implemented as partially (e.g., 50%) a touchscreen and partially (e.g., 50%) physical buttons and/or features.

In some embodiments, a guidance device may be waterproof. In some implementations, a guidance device may be placed inside of a waterproof case, e.g., a custom plastic, transparent case that was designed to fit over or to receive the guidance device. In some implementations, the guidance device itself (e.g., the outer shell and/or the display area) may be waterproof. The device be designed to be waterproof at the time of manufacture, for example, by ensuring that all joints and places where parts connect are sealed.

In some embodiments, a guidance device may include a hanging mechanism, for example, to allow the guidance device (e.g., guidance device 104 of FIG. 1) to hang on a wall of a shower stall or other substantially vertical surface. The hanging mechanism may be, for example, hook(s), suction cup(s), or other hanging mechanism. In some embodiments, a guidance device may include a placement mechanism, for example, to allow the guidance device to stand (e.g., angled appropriately) on a surface (e.g., a counter top or shower floor). The placement mechanism may be, for example, a support leg, tripod or the like. The hanging mechanism and/or the placement mechanism may be part of a case (e.g., a waterproof case) associated with the guidance device. Alternatively, the hanging mechanism and/or placement mechanism may couple with or attach to or be part of the guidance device (e.g., the outer shell of the guidance device).

In some embodiments, the guidance device may include or be coupled to a shower head device. For example, if the guidance device includes a custom molded outer shell, the shower head device may be molded together with the outer shell or attached to the outer shell during manufacture. Alternative, if the guidance device may be in communication with a shower head device, e.g., via a wired or wireless communication link. The shower head device may screw onto a shower nozzle, for example, like some store-sold shower heads. The shower head device may have a unique and/or fun shape, e.g., a shape that is pleasing to children, such as a flower, etc. The shower head device may affect the flow of water that comes out of the shower nozzle. The shower head device may block the flow of water out of the nozzle, for example, until the guidance device indicates to the shower head device (e.g., as a result of a user pressing task start button 242) that it should allow water to flow. The shower head device may adjust the type of spray (e.g., fine or thick, constant or pulsing) and/or the intensity of the spray (e.g., light or hard). The shower nozzle may adjust the spray depending on the sub-task that is currently being performed. For example, if the child is washing hair, the shower head device may spray harder and thicker, whereas, if the child is washing arms, the shower head device may spray a narrower and thinner stream. Types of spray may be associated with various subtasks as setting in the guidance device, and may be configured via setup mode as explained for other settings herein.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 8:
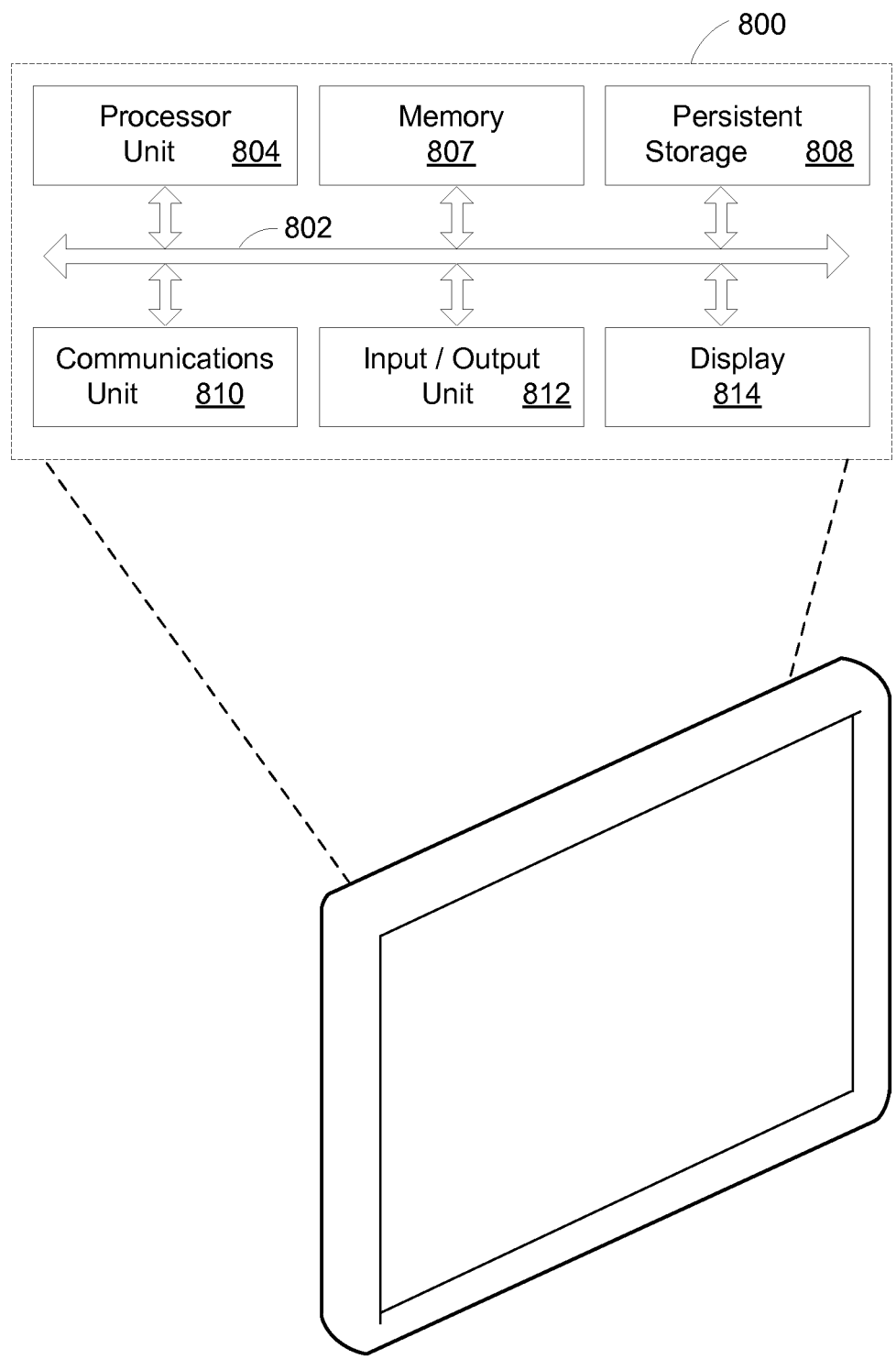
FIG. 8 depicts a block diagram of an example data processing system that may be included within a guidance device and/or a separate computing device, according to one or more embodiments of the present disclosure.

FIG. 8 depicts a block diagram of an example data processing system 800 that may be included within a guidance device (e.g., guidance devices 104, 204, 500, 704, etc.) and/or a separate computing device (e.g., laptop 706), according to one or more embodiments of the present disclosure. The data processing system 800 may be used to execute, either partially or wholly, one or more of the methods, routines and/or solutions of the present disclosure (e.g., the methods, routines and/or solutions performed by task guide 506). In some embodiments of the present disclosure, more than one data processing system, for example data processing systems 800, may be used to implement the methods, routines, techniques and/or solutions described herein. In the example of FIG. 8, data processing system 800 may include a communications fabric 802 which provides communications between components, for example a processor unit 804, a memory 807, a persistent storage 808, a communications unit 810, an input/output (I/O) unit 812 and a display 814. A bus system may be used to implement communications fabric 802 and may be comprised of one or more buses such as a system bus or an input/output bus. The bus system may be implemented using any suitable type of architecture that provides for a transfer of data between different components or devices attached to the bus system.

Processor unit 804 may serve to execute instructions (for example, a software program, an application, Software Development Kit (SDK) code, native Operating System (OS) code and the like) that may be loaded into the data processing system 800, for example, into memory 807. Processor unit 804 may be a set of one or more processors or may be a multiprocessor core depending on the particular implementation. Processor unit 804 may be implemented using one or more heterogeneous processor systems in which a main processor is present with secondary processors on a single chip. As another illustrative example, processor unit 804 may be a symmetric multi-processor system containing multiple processors of the same type.

Memory 807 may be, for example, a random access memory or any other suitable volatile or nonvolatile storage device. Memory 807 may include one or more layers of cache memory. Persistent storage 808 may take various forms depending on the particular implementation. For example, persistent storage 808 may contain one or more components or devices. For example, persistent storage 808 may be a hard drive, a solid-state drive, a flash memory or some combination of the above. Persistent storage may include, for example, setting storage 516 and/or media storage 518.

Instructions for an operating system may be located on persistent storage 808. In one specific embodiment, the operating system may be some version of a number of known operating systems for mobile devices or smartphones (e.g, Android, iOS, etc.). Instructions for applications and/or programs may also be located on persistent storage 808. These instructions may be loaded into memory 807 for execution by processor unit 804. For example, the methods and/or processes of the different embodiments described in this disclosure may be performed by processor unit 804 using computer implemented instructions which may be loaded into a memory such as memory 807. These instructions are referred to as program code, computer usable program code or computer readable program code that may be read and executed by a processor in processor unit 804.

Display 814 may provide a mechanism to display information to a user, for example, via a LCD or LED screen or monitor or touchscreen, or other type of display. It should be understood, throughout this disclosure, that the term "display" may be used in a flexible manner to refer to either a physical display such as a physical screen, or to the image that a user sees on the screen of a physical device. Input/output (I/O) unit 812 allows for input and output of data with other devices that may be connected to data processing system 800. Input/output devices can be coupled to the system either directly or through intervening I/O controllers.

Communications unit 810 may provide for communications with other data processing systems or devices, for example, via one or more networks. Communications unit 810 may be a network interface card. Communications unit 810 may provide communications through the use of wired and/or wireless communications links. In some embodiments, the communications unit may include circuitry that is designed and/or adapted to communicate according to various wireless communication standards, for example, cellular standards, WIFI standards, BlueTooth standards and the like.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown.

Various embodiments of the present disclosure describe one or more systems, methods, routines and/or techniques for guiding a child (or other person) to perform tasks. One or more embodiments may describe a guidance device comprising a display and circuitry and/or computer code disposed in the guidance device. The display may shows to a user a figure with multiple parts. The circuitry and/or computer code may be operable to progress through multiple defined time segments. During each one of the multiple defined time segments, the circuitry and/or computer code may cause the guidance device to indicate one or more of the multiple parts of the figure that are associated with the time segment and with a sub-task that the user should perform. The circuitry and/or computer code may cause the guidance device to indicate completion progress of the time segment and the sub-task. The guidance device may include a speaker coupled to the circuitry and/or computer code. During each one of the multiple defined time segments, the circuitry and/or computer code may cause the speaker to emit an instructional sound that is associated with the time segment and the sub-task that the user should perform. The guidance device may include a microphone coupled to the circuitry and/or computer code. The circuitry and/or computer code may be operable to receive multiple audio samples from the microphone, and the circuitry and/or computer code may be operable to save the multiple audio samples to a memory unit disposed in the guidance device. For each one of the multiple defined time segments, the instructional sound may be selected from the multiple audio samples.

In some embodiments, the figure is a plastic translucent figure, and the display includes one or more LED lights disposed under the figure. In some embodiments, the one or more LED lights includes one LED light for each one of the multiple parts of the figure, and during each one of the multiple defined time segments, to indicate the one or more of the multiple parts of the figure, the LED light(s) associated with the one or more of the multiple parts light up. In some embodiments, the display includes a touchscreen that displays the figure and the indication of completion progress of the time segment and the sub-task. In some embodiments, the guidance device may include a speaker coupled to the circuitry and/or computer code. During the progression through the multiple defined time segments, the circuitry and/or computer code may cause the speaker to emit one or more songs. In some embodiments, the guidance device may include an input mechanism coupled to the circuitry and/or computer code. The input mechanism may allow a user to change the number of time segments in the multiple defined time segments. The input mechanism may allow a user to change the amount of time associated with each of the multiple defined time segments.

One or more embodiments of the present disclosure may describe a method performed in a guidance device composed of a display and circuitry and/or computer code coupled to the display. The method may include receiving an indication that a task should be started, wherein the task includes multiple sub-tasks, and wherein each sub-task is associated with a defined time segment. The method may include displaying, via the display, a figure with multiple parts. The method may include for each sub-task, during the time segment associated with the sub-task, indicating, via the display, one or more of the multiple parts of the figure that are associated with the sub-task. The method may include for each sub-task, during the time segment associated with the sub-task, indicating completion progress of the time segment and the sub-task. The method may include, for each sub-task, during the time segment associated with the sub-task, emitting, via a speaker coupled to the circuitry and/or computer code, an instructional sound that is associated with the sub-task. The method may include receiving multiple audio samples from a microphone coupled to the circuitry and/or computer code. The method may include saving the multiple audio samples to a memory unit coupled to the circuitry and/or computer code. The method may include selecting the instructional sound from the multiple audio samples. In some embodiments, indicating the one or more of the multiple parts of the figure may include causing the one or more of the multiple parts to light up, change color or blink. The method may include, during the time segments associated with the sub-tasks, emitting, via a speaker coupled to the circuitry and/or computer code, one or more songs. The method may include, receiving, via an input mechanism coupled to the circuitry and/or computer code, user input that causes the change the number of sub-task of the multiple sub-tasks to change. The method may include receiving, via an input mechanism coupled to the circuitry and/or computer code, user input that causes the defined time segment associated with one or more of the multiple sub-tasks to change.

One or more embodiments of the present disclosure may describe a portable computing device, comprising a display and circuitry and/or computer code coupled to the display. The circuitry and/or computer code may be operable to cause the computing device to instruct a user how to perform a task by indicating, for multiple sub-tasks included in the task, body parts and an actions that the user should take with regard to the body parts. The circuitry and/or computer code may be operable to cause the computing device to instruct a user how to perform a task by indicating, for multiple sub-tasks included in the task, body parts and an actions that the user should take with regard to the body parts. The portable computing device may include a figure with multiple body parts, wherein the circuitry and/or computer code is operable to cause parts of the multiple body parts to light up, change color or blink to perform the indications. The portable computing device may include a speaker coupled to the circuitry and/or computer code, wherein the circuitry and/or computer code is operable to cause the speaker to emit instructional sounds to perform the indications. In some embodiments, the number of sub-tasks included in the task is configurable, and the instructional sounds are configurable.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A guidance device, comprising:
a display, wherein the display shows to a user a figure with multiple parts;
circuitry disposed in the guidance device, the circuitry being operable to progress through multiple defined time segments of a user task;
an input mechanism coupled to the circuitry, wherein the input mechanism allows selection of a mode of operating the guidance device, wherein operation in a first mode enables creation of a corresponding personalized user interface for each of a plurality of users, and wherein operation in a second mode enables guidance in performance of the user task by a particular one of the plurality of users using the corresponding personalized user interface; and
wherein during each one of the multiple defined time segments, the circuitry causes the guidance device to:
indicate one or more of the multiple parts of the figure that are associated with the one of the multiple defined time segments and with a sub-task that the user should perform; and
indicate completion progress of one or both of: the one of the multiple defined time segments and the sub-task.

2. The guidance device of claim 1, further comprising a speaker coupled to the circuitry, wherein during each one of the multiple defined time segments, the circuitry further causes the speaker to emit an instructional sound that is associated with the one of the multiple defined time segments and the sub-task that the user should perform.

3. The guidance device of claim 2, further comprising a microphone coupled to the circuitry, wherein the circuitry is operable to receive multiple audio samples from the microphone, and wherein the circuitry is operable to save the multiple audio samples to a memory unit disposed in the guidance device, and wherein for each one of the multiple defined time segments, the instructional sound is selected from the multiple audio samples.

4. The guidance device of claim 1, wherein the figure is a plastic translucent figure, and wherein the display includes one or more LED lights disposed under the figure.

5. The guidance device of claim 4, wherein the one or more LED lights includes one LED light for each one of the multiple parts of the figure, and wherein during each one of the multiple defined time segments, to indicate the one or more of the multiple parts of the figure, the LED light(s) associated with the one or more of the multiple parts light up.

6. The guidance device of claim 1, wherein the display includes a touchscreen that displays the figure and the indication of completion progress of the one of the multiple defined time segments and the sub-task.

7. The guidance device of claim 1, further comprising a speaker coupled to the circuitry, wherein while progressing through the multiple defined time segments, the circuitry further causes the speaker to emit one or more songs.

8. The guidance device of claim 1, further comprising an input mechanism coupled to the circuitry, wherein the input mechanism allows the user to change an amount of time associated with each of the multiple defined time segments.

9. A method comprising, in a guidance device composed of a display and circuitry coupled to the display:
  receiving an indication that guidance of a user task should be started, wherein the user task includes multiple sub-tasks, and wherein each sub-task is associated with a defined time segment;
  receiving, via an input mechanism coupled to the circuitry, user input that selects a mode of operating the guidance device, wherein operation in a first mode enables creation of a corresponding personalized user interface for each of a plurality of users, and wherein operation in a second mode enables guidance in performance of the user task by a particular one of the plurality of users using the corresponding personalized user interface;
  displaying, via the display, a figure with multiple parts; and
  for each sub-task, during the defined time segment associated with the sub-task:
    indicating, via the display, one or more of the multiple parts of the figure that are associated with the sub-task; and
    indicating completion progress of one or both of: the defined time segment associated with the sub-task and the sub-task.

10. The method of claim 9, further comprising, for each sub-task, during the defined time segment associated with the sub-task, emitting, via a speaker coupled to the circuitry, an instructional sound that is associated with the sub-task.

11. The method of claim 10, further comprising:
  receiving multiple audio samples from a microphone coupled to the circuitry;
  saving the multiple audio samples to a memory unit coupled to the circuitry; and
  selecting the instructional sound from the multiple audio samples.

12. The method of claim 9, wherein indicating the one or more of the multiple parts of the figure includes causing the one or more of the multiple parts to light up, change color or blink.

13. The method of claim 9, further comprising, during the defined time segments associated with the sub-tasks, emitting, via a speaker coupled to the circuitry, one or more songs.

14. The method of claim 13, further comprising receiving, via an input mechanism coupled to the circuitry, user input that causes the defined time segment associated with one or more of the multiple sub-tasks to change.

15. A portable computing device, comprising a display and circuitry coupled to the display, wherein the circuitry is operable to receive user input that selects a mode of operating the portable computing device, wherein operation in a first mode enables creation of a corresponding personalized user interface for each of a plurality of users, and wherein operation in a second mode enables the portable computing device to instruct a user how to perform a user task by producing indications, for multiple sub-tasks included in the task, body parts and actions that the user should take with regard to the body parts.

16. The portable computing device of claim 15, further comprising a figure with multiple body parts, wherein the circuitry is operable to cause parts of the multiple body parts to light up, change color or blink to perform the indications.

17. The portable computing device of claim 15, further comprising a speaker coupled to the circuitry, wherein the circuitry is operable to cause the speaker to emit instructional sounds to perform the indications.

18. The portable computing device of claim 17, wherein the instructional sounds are configurable.

19. The device of claim 1, wherein the circuitry of the guidance device comprises a non-transitory computer-readable medium on which is stored executable computer code.

20. The method of claim 9, wherein the circuitry of the guidance device comprises a non-transitory computer-readable medium on which is stored executable computer code.

21. The portable computing device of claim 15, wherein the circuitry comprises a non-transitory computer-readable medium on which is stored executable computer code.

22. The device of claim 1, wherein creation of the personalized user interface comprises download of sound information to the guidance device, for playback during performance of the user task.

23. The device of claim 1, wherein selection of the mode of operation of the guidance device is performed from a location remote from the guidance device, via a communication network.

24. The device of claim 1, wherein the guidance device controls a device separate from the guidance device, to enable performance of the user task.

25. The method of claim 9, wherein creation of the personalized user interface comprises download of sound information to the guidance device from a remote computing device, for playback during performance of the user task.

26. The method of claim 9, wherein selection of the mode of operation of the guidance device is performed from a location remote from the guidance device, via a communication network.

27. The method of claim 9, further comprising controlling a device separate from the guidance device, to enable performance of the user task.

28. The portable computing device of claim 15, wherein creation of the personalized user interface comprises download of sound information to the portable computing device, for playback during performance of the user task.

29. The portable computing device of claim 15, wherein selection of the mode of operation of the guidance device is performed from a location remote from the portable computing device, via a communication network.

30. The portable computing device of claim 15, wherein the portable computing device controls a device separate from the portable computing device, to enable performance of the user task.

* * * * *